(12) United States Patent
Lickiss et al.

(10) Patent No.: US 12,515,272 B2
(45) Date of Patent: Jan. 6, 2026

(54) WELD ANGLE CORRECTION DEVICE

(71) Applicant: Lincoln Global, Inc., Santa Fe Springs, CA (US)

(72) Inventors: Emily A. Lickiss, Fort Collins, CO (US); Levi J. Mitchell, Windsor, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 99 days.

(21) Appl. No.: 18/631,387

(22) Filed: Apr. 10, 2024

(65) Prior Publication Data

US 2024/0269760 A1    Aug. 15, 2024

Related U.S. Application Data

(63) Continuation-in-part of application No. 18/201,258, filed on May 24, 2023, which is a continuation-in-part
(Continued)

(51) Int. Cl.
*B25J 11/00* (2006.01)
*B23K 9/095* (2006.01)
(Continued)

(52) U.S. Cl.
CPC ............ *B23K 9/0953* (2013.01); *B25J 9/163* (2013.01); *B25J 11/005* (2013.01); *B25J 13/06* (2013.01)

(58) Field of Classification Search
CPC ...... B25J 9/1697; B25J 9/1664; B25J 11/005; B25J 13/08; B25J 9/1679; B25J 9/1684;
(Continued)

(56) References Cited

U.S. PATENT DOCUMENTS 4,118,620 A    10/1978    Wall, Jr. et al.
4,750,663 A     6/1988    Warczak
(Continued)

FOREIGN PATENT DOCUMENTS

CN    104128692 A    11/2014
CN    110524581 A    12/2019
(Continued)

OTHER PUBLICATIONS

Extended European Search Report for Corresponding Application No. EP24198649.6; Dated Feb. 18, 2025; pp. 1-9.
(Continued)

*Primary Examiner* — Ian Jen
(74) *Attorney, Agent, or Firm* — David J. Muzilla

(57) ABSTRACT

In one embodiment, weld torch angle tools are provided to present an operator with the work angle and travel angle measured as taught in the weld point. The operator is presented with buttons to make small adjustments which the robot will move to in live updates to independently tune each angle. If the base plate is tilted, a workflow is provided to the operator to teach that tilt to the robot, allowing the measured angles and axes to be adjusted accordingly. This allows the operator to accurately dial in the exact angle measures specified for a given weld and to visually confirm the validity of the weld point as adjusted, to prevent any unexpected collision or robot reach issues.

20 Claims, 21 Drawing Sheets

Related U.S. Application Data of application No. 17/978,342, filed on Nov. 1, 2022, now Pat. No. 12,208,530.

(60) Provisional application No. 63/536,785, filed on Sep. 6, 2023, provisional application No. 63/454,395, filed on Mar. 24, 2023, provisional application No. 63/349,180, filed on Jun. 6, 2022.

(51) Int. Cl.
*B25J 9/16* (2006.01)
*B25J 13/06* (2006.01)

(58) Field of Classification Search
CPC ............... B23K 37/0229; G06T 7/593; G06T 2207/10028; G06T 2207/30136; G05B 2219/39001; G05B 2219/45104; G05B 19/42; G05B 2219/39137
See application file for complete search history.

(56) References Cited

U.S. PATENT DOCUMENTS

| | | | |
|---|---|---|---|
| 5,014,183 A | 5/1991 | Carpenter et al. | |
| 5,465,037 A | 11/1995 | Huissoon et al. | |
| 5,799,135 A | 8/1998 | Terawaki | |
| 5,841,104 A | 11/1998 | Svensson | |
| 5,845,053 A | 12/1998 | Watanabe et al. | |
| 6,362,456 B1 | 3/2002 | Ludewig et al. | |
| 7,962,967 B2 * | 6/2011 | Becker | B23K 9/322 2/8.8 |
| 9,352,411 B2 * | 5/2016 | Batzler | G09B 19/24 |
| 9,833,857 B2 | 12/2017 | Artelsmair | |
| 10,152,034 B2 | 12/2018 | Komatsu et al. | |
| 11,407,110 B2 | 8/2022 | Lonsberry et al. | |
| 2005/0149231 A1 | 7/2005 | Pretlove et al. | |
| 2005/0256611 A1 | 11/2005 | Pretlove et al. | |
| 2016/0114418 A1 | 4/2016 | Jones et al. | |
| 2016/0375524 A1 | 12/2016 | Hsu | |
| 2019/0047068 A1 | 2/2019 | Magnasco et al. | |
| 2020/0078945 A1 | 3/2020 | Sun et al. | |
| 2020/0114449 A1 | 4/2020 | Chang et al. | |
| 2020/0139474 A1 | 5/2020 | Mayer et al. | |
| 2021/0138646 A1 | 5/2021 | Matsushima | |
| 2022/0152720 A1 | 5/2022 | Hazui et al. | |
| 2023/0088582 A1 | 3/2023 | Uchikata et al. | |

FOREIGN PATENT DOCUMENTS

| | | |
|---|---|---|
| CN | 113119122 A | 7/2021 |
| CN | 114055781 A | 2/2022 |
| CN | 114505560 A | 5/2022 |
| CN | 114515924 A | 5/2022 |
| CN | 114799521 A | 7/2022 |
| CN | 114839995 A | 8/2022 |
| CN | 218426128 U | 2/2023 |
| EP | 2 375 298 A2 | 10/2011 |
| JP | S55-136575 A | 10/1980 |
| JP | H0-5123866 A | 5/1993 |
| JP | H06-79459 A | 3/1994 |
| JP | H08-118022 A | 5/1996 |
| JP | 2009-119525 A | 6/2009 |
| JP | 5103147 B2 | 12/2012 |
| JP | 2014-231137 A | 12/2014 |
| KR | 1998-0026434 A | 7/1998 |
| KR | 10-0454472 B1 | 12/2004 |
| TW | 1622451 B | 5/2018 |
| WO | 2022/016152 A1 | 1/2022 |

OTHER PUBLICATIONS

Ryberg, et al.; "Stereo Vision for Path Correction in Off-Line Programmed Robot Welding;" 2010 IEEE International Conference on Industrial Technology; Dated Mar. 14, 2010; pp. 1700-1705.

Extended European Search Report for corresponding European Application No. 23177414.2; Dated Feb. 21, 2024; pp. 1-15.

Extended European Search Report for Corresponding Application No. 23177412.6; Dated Oct. 31, 2023; pp. 1-14.

Extended European Search Report for Corresponding Application No. 23177416.7; Dated Nov. 6, 2023; pp. 1-16.

Extended European Search Report for Corresponding Application No. 23177415.9; Dated Nov. 8, 2023; pp. 1-14.

Vectis Automation; "MultiPass Feature on the Vectis Cobot Welding Tool;" https://www.youtube.com/watch?v=q0XW1 iVjOI0; Online Publication Date Dec. 12, 2020; pp. 1-2.

* cited by examiner

Original Part

With Markup

What the Robot sees

WELD ANGLE CORRECTION DEVICE

CROSS REFERENCE TO RELATED APPLICATION/INCORPORATION BY REFERENCE

This U.S. patent application is a continuation-in-part (CIP) patent application of U.S. patent application Ser. No. 18/201,258 filed on May 24, 2023, which is a continuation-in-part (CIP) patent application of U.S. patent application Ser. No. 17/978,342 filed on Nov. 1, 2022, which claims priority to and the benefit of U.S. Provisional Patent Application Ser. No. 63/349,180 filed on Jun. 6, 2022, all of which are incorporated herein by reference in their entirety. U.S. patent application Ser. No. 18/201,258 also claims priority to and the benefit of U.S. Provisional Patent Application Ser. No. 63/454,395 filed on Mar. 24, 2023, which is incorporated herein by reference in its entirety. This U.S. Patent Application also claims priority to and the benefit of U.S. Provisional Patent Application Ser. No. 63/536,785 filed on Sep. 6, 2023. U.S. Published Patent Application No. 2020/0139474 A1 is incorporated herein by reference it its entirety. U.S. Pat. No. 9,833,857 B2 is incorporated herein by reference in its entirety.

FIELD

Embodiments of the present invention relate to the use of robots (e.g., collaborative robots or cobots) for welding or cutting. More specifically, some embodiments of the present invention relate to a welding angle correction tool and methods for setting and correcting recorded robot welding/cutting torch orientations as positioned by a human user when training a robot to traverse a weld joint.

BACKGROUND

Programming motion trajectories of a robot (e.g., a collaborative robot) prior to actual welding or cutting can be quite complicated. In addition to the challenges associated with programming a weld trajectory along a weld joint, other challenges exist that are associated with setting and programming angles and orientations of a welding or cutting torch at points along the trajectory. Today, users have to manually set torch angles along a weld trajectory or weld path by carefully positioning a robot torch. Welds taught with a collaborative robot can be less precise in the location and orientation of weld points. The orientation of the weld torch with respect to the weld path and plates to be welded together can dictate the quality of the weld. The current teaching methods rely on visual inspection of the weld. In addition, any slope or tilting in the weld plates can change the measured orientation.

SUMMARY

In one embodiment, weld torch angle tools are provided to present an operator with the work angle and travel angle measured as taught in the weld point. The operator is presented with buttons to make small adjustments which the robot will move to in live updates to independently tune each angle. If the base plate is tilted, a workflow is provided to the operator to teach that tilt to the robot, allowing the measured angles and axes to be adjusted accordingly. This allows the operator to accurately dial in the exact angle measures (e.g., to within one degree) specified for a given weld and to visually confirm the validity of the weld point as adjusted, to prevent any unexpected collision or robot reach issues. In one embodiment, an application of the weld torch angle tools calculates the weld frame and the orientation of the torch with respect to the weld frame. The orientation is parsed into a work angle and a travel angle measurement and presented to the operator. Adjustment tools are provided to allow the operator to fine tune the work and travel angles, moving the robot at the same time to allow visual inspection as well as numeric measurements. For weld plates that are tilted, a workflow is available to allow the operator to adjust the measured angles based on the tilt. Once the operator is satisfied, the weld point can be saved with the fine-tuned location.

In one embodiment, a weld angle correction tool for adjusting angles of a welding torch positioned by a user while training a robot of a robotic welding system is provided. The weld angle correction tool includes a computer device configured to operatively interface to the robotic welding system and having weld torch angle software application tools. The weld angle correction tool also includes a display operatively interfacing to the computer device and at least one user interface operatively interfacing to the computer device. The weld torch angle software application tools are programmed to display user interface screens on the display. The weld torch angle software application tools are also programmed to allow a user to interact with the user interface screens, via the at least one user interface, to make fine adjustments to at least one torch angle of a welding torch of the robotic welding system, where the at least one torch angle is associated with a taught weld point for a weldment. The weld torch angle software application tools are also programmed to command the collaborative robot to move the welding torch based on the fine adjustments to the at least one torch angle in real time as the user makes the fine adjustments via the user interface screens, and allow the user to electronically save the weld point with the fine adjustments. Certain embodiments also provide various other features. For example, the weld torch angle software application tools are programmed to aid the user in confirming the fine adjustments, as commanded. The weld torch angle software application tools are programmed to display a workflow to the user via the user interface screens to guide the user to teach the robotic welding system a tilt of a baseplate of the weldment and automatically adjust the at least one torch angle based on the tilt. The weld torch angle software application tools are programmed to calculate a weld frame and an orientation of the welding torch with respect to the weld frame, parse the orientation into a work angle measurement and a travel angle measurement, and present the work angle measurement and the travel angle measurement to the user via the user interface screens. The at least one torch angle includes a torch work angle or a torch travel angle. The weld torch angle software application tools are programmed to allow a user to edit a weld point via the user interface screens and the at least one user interface. The weld torch angle software application tools are programmed to display an adjust weld angles window as one of the user interface screens, allowing the user to adjust a torch work angle, a torch travel angle, and a torch spin via the at least one user interface. The weld torch angle software application tools are programmed to allow the user to adjust the at least one torch angle by increments of +1 degree, +5 degrees, −1 degrees, and −5 degrees via the user interface screens and the at least one user interface. The weld torch angle software application tools are programmed to allow the user to command the robotic welding system, via the user interface screens and the at least one user interface, to move the welding torch to the taught weld point. The weld torch angle software application tools are programmed to allow the user to make fine adjustments in a weld coordinate frame at least along a base plate of the weldment.

In one embodiment, a robotic welding system for adjusting angles of a welding torch positioned by a user while training the robotic welding system is provided. The robotic welding system includes a robot having an arm, a welding torch operatively connected to the arm of the robot. a robot controller operatively connected to the robot, and a weld angle correction tool. The weld angle correction tool includes a computer device configured to operatively interface to the robot controller and having weld torch angle software application tools. The weld angle correction tool also includes a display operatively interfacing to the computer device, and at least one user interface operatively interfacing to the computer device. The weld angle correction tool is configured to display user interface screens on the display. The weld angle correction tool is also configured to allow a user to interact with the user interface screens, via the at least one user interface, to make fine adjustments to at least one torch angle of the welding torch of the robotic welding system, where the at least one torch angle is associated with a taught weld point for a weldment. The weld angle correction tool is also configured to command the collaborative robot to move the welding torch based on the fine adjustments to the at least one torch angle in real time as the user makes the fine adjustments via the user interface screens, and allow the user to electronically save the weld point in the robot controller with the fine adjustments. Certain embodiments also provide various other features. For example, the weld angle correction tool is configured to aid the user in confirming the fine adjustments, as commanded. The weld angle correction tool is configured to display a workflow to the user via the user interface screens to guide the user to teach the robotic welding system a tilt of a baseplate of the weldment and automatically adjust the at least one torch angle based on the tilt. The weld angle correction tool is configured to calculate a weld frame and an orientation of the welding torch with respect to the weld frame, parse the orientation into a work angle measurement and a travel angle measurement, and present the work angle measurement and the travel angle measurement to the user via the user interface screens. The at least one torch angle includes a torch work angle or a torch travel angle. The weld angle correction tool is configured to allow a user to edit a weld point via the user interface screens and the at least one user interface. The weld angle correction tool is configured to display an adjust weld angles window as one of the user interface screens, allowing the user to adjust a torch work angle, a torch travel angle, and a torch spin via the at least one user interface. The weld angle correction tool is configured to allow the user to adjust the at least one torch angle by increments of +1 degree, +5 degrees, −1 degree, and −5 degrees via the user interface screens and the at least one user interface. The weld angle correction tool is configured to allow the user to command the robotic welding system, via the user interface screens and the at least one user interface, to move the welding torch to the taught weld point. The weld angle correction tool is configured to allow the user to make fine adjustments in a weld coordinate frame at least along a base plate of the weldment.

In one embodiment, a robotic welding or cutting system is configured to allow a human user to train a robot of the system by positioning a welding or cutting torch attached to an arm of the robot at various points along a joint/seam of a weldment to be welded or cut. The user moves the arm of the robot to position a tip of the torch at a desired point along the joint/seam and the point is recorded by the robot controller (i.e., the robot controller records the spatial coordinates and angular orientations of the torch at the point). In accordance with an embodiment of the present invention, the user does not have to be particularly careful about how the angles (e.g., a push angle and a work angle) of the torch are positioned by the user with respect to the weldment and corresponding joint/seam. The weld angle correction tool includes a depth camera that acquires stereoscopic depth image data which is used to determine the actual torch angles of the torch, as positioned by the user, with respect to the joint/seam. Once the user has positioned the torch and recorded the corresponding desired points along the joint, the user can activate a weld angle correction tool to select a recorded point and make corrections to the recorded parameters (e.g., push angle and work angle) associated with that point.

In one embodiment, a method of correcting angles of a welding torch positioned by a user while training a robot of a robotic welding system is provided. Stereoscopic image data of a weldment and a corresponding weld seam is acquired and 3D point cloud data is generated. 3D plane and intersection data is generated from the 3D point cloud data, representing the weldment and weld seam. User-placed 3D torch position and orientation data for a recorded weld point along the weld seam is imported. A torch push angle and a torch work angle are calculated for the recorded weld point, with respect to the weldment and weld seam, based on the user-placed torch position and orientation data and the 3D plane and intersection data. The torch push angle and the torch work angle are corrected for the recorded weld point based on pre-stored ideal angles for the weld seam.

In one embodiment, a method of correcting angles of a welding torch positioned by a user while training a robot of a robotic welding system is provided. The method includes acquiring weldment depth data of a weldment and a corresponding weld seam using a depth camera of a weld angle correction tool, and processing the weldment depth data using a computer of the weld angle correction tool. In one embodiment, the weldment depth data is stereoscopic image data. In one embodiment, the computer of the weld angle correction tool uses matrix manipulation techniques, point cloud manipulation techniques, and feature recognition techniques as part of processing the weldment depth data. The method also includes importing user-placed 3D torch position and orientation data to the computer of the weld angle correction tool from a robot controller of a robotic welding system in a robot coordinate space for a recorded weld point along the corresponding weld seam. The method further includes calculating, using the computer of the weld angle correction tool, at least one torch angle for the recorded weld point with respect to the weldment and the corresponding weld seam in the robot coordinate space based on the weldment depth data of the weldment and the corresponding weld seam, as processed by the computer of the weld angle correction tool, and the user-placed 3D torch position and orientation data. The method also includes correcting the at least one torch angle for the recorded weld point based on pre-stored ideal angles for the weldment and the corresponding weld seam. In one embodiment, the processing of the weldment depth data includes generating 3D point cloud data from the stereoscopic image data in the robot coordinate space using the computer of the weld angle correction tool. In one embodiment, the processing of the weldment depth data includes generating 3D plane and intersection data representative of the weldment and the corresponding weld seam from the 3D point cloud data in the robot coordinate space using the computer of the weld angle correction tool. The torch angle may include, for example, a torch push angle and/or a torch work angle. In one embodiment, the weldment depth data is transmitted via at least one of a wired or a wireless means from the depth camera to the computer of the weld angle correction tool. In one embodiment, the user-placed 3D torch position and orientation data is transmitted via at least one of a wired or a wireless means from the robot controller to the computer of the weld angle correction tool. In one embodiment, a position of the depth camera is calibrated to one of a tip of the welding torch or a tool center point (TCP) of the robot.

In one embodiment, a weld angle correction tool for correcting angles of a welding torch positioned by a user while training a robot of a robotic welding system is provided. The weld angle correction tool includes a depth camera configured to acquire weldment depth data of a weldment and a corresponding weld seam to be welded by a robotic welding system having a welding torch. The weld angle correction tool also includes a computer device configured to receive the weldment depth data from the depth camera, and user-placed 3D torch position and orientation data from a robot controller of the robotic welding system for a recorded weld point along the corresponding weld seam. The computer device is further configured to calculate at least one torch angle of the welding torch for the recorded weld point with respect to the weldment and the corresponding weld seam in a coordinate space of the robotic welding system based on the weldment depth data and the user-placed torch position and orientation data. The computer device is also configured to calculate at least one corrected torch angle based on the at least one torch angle for the recorded weld point, as calculated, and pre-stored ideal angles for the weldment and the corresponding weld seam. In one embodiment, the weldment depth data is stereoscopic image data. In one embodiment, the depth camera includes two imaging apertures for acquiring the stereoscopic image data. In one embodiment, calculating of the at least one torch angle using the computer device includes generating 3D point cloud data from the stereoscopic image data in the coordinate space of the robotic welding system. In one embodiment, calculating of the at least one torch angle using the computer device includes generating 3D plane and intersection data representative of the weldment and the corresponding weld seam from the 3D point cloud data in the coordinate space of the robotic welding system. In one embodiment, the computer device is in the form of a laptop computer. In one embodiment, the computer device is integrated into the robot controller of the robotic welding system. In one embodiment, the computer device is integrated into a welding power supply of the robotic welding system. In one embodiment, the depth camera is configured to be removably attached to the welding torch. In one embodiment, the depth camera is configured to be mounted on joint 6 of a robot arm of the robotic welding system.

One embodiment of a method includes correcting angles of a welding torch positioned by a user while training a robot of a robotic welding system. The method includes acquiring a single image of weldment depth data of a weldment and a corresponding weld seam using a depth camera of a weld angle correction tool. The method also includes processing the weldment depth data using a computer of the weld angle correction tool. The method further includes importing user-placed 3D torch position and orientation data to the computer of the weld angle correction tool from a robot controller of a robotic welding system in a robot coordinate space for multiple recorded weld points along the corresponding weld seam. The method also includes calculating, using the computer of the weld angle correction tool, a torch angle for one recorded weld point of the multiple recorded weld points with respect to the weldment and the corresponding weld seam in the robot coordinate space based on the weldment depth data of the weldment and the corresponding weld seam, as processed by the computer of the weld angle correction tool, and the user-placed 3D torch position and orientation data. The method further includes correcting the torch angle for the one recorded weld point, resulting in a corrected torch angle for the one recorded weld point, based on pre-stored ideal angles for the weldment and the corresponding weld seam. The method also includes applying the corrected torch angle for the one recorded weld point to other weld points of the multiple recorded weld points along the corresponding weld seam.

One embodiment of a method includes correcting angles of a welding torch positioned by a user while training a robot of a robotic welding system. The method includes determining 3D position and orientation data of a weld plane and a corresponding weld seam of a weldment in a robot coordinate space of a robotic welding system using a touch-sense searching strategy. The method also includes importing user-placed 3D torch position and orientation data to a computer of a weld angle correction tool from a robot controller of the robotic welding system in the robot coordinate space for a recorded weld point along the corresponding weld seam. The method further includes calculating, using the computer of the weld angle correction tool, a torch angle for the recorded weld point with respect to the weldment and the corresponding weld seam in the robot coordinate space based on the 3D position and orientation data of the weld plane and the corresponding weld seam of the weldment, and further based on the user-placed 3D torch position and orientation data. The method also includes correcting the torch angle for the recorded weld point based on pre-stored ideal angles for the weldment and the corresponding weld seam.

One embodiment of a method includes supporting training of a robot of a robotic welding system. The method includes acquiring a single image of a weldment in a regular camera view using a single image aperture of a depth camera of a weld assist tool, and acquiring a single image of weldment depth data of the weldment using the depth camera of the weld assist tool. The weld assist tool may be similar to the weld angle correction tool, or the weld assist tool may include the weld angle correction tool, in accordance with various embodiments. The method also includes processing the single image of the weldment depth data using a computer of the weld assist tool to determine a 3D corner feature of the weldment in a 3D coordinate space of a robotic welding system. The method further includes displaying the single image of the weldment, as acquired, on a display device of the weld assist tool. The method also includes displaying augmented reality lines overlaid onto the single image of the weldment on the display device of the weld assist tool, where the augmented reality lines are overlaid onto seams (e.g., three seams) of the 3D corner feature. The method further includes selecting weld points along a seam of the seams of the 3D corner feature using a user interface of the weld assist tool. The method also includes recording position data, with respect to the 3D coordinate space and corresponding to the weld points as selected, within a memory of the computer of the weld assist tool and/or a controller of the robotic welding system to define a weld path.

One embodiment of a method includes supporting training of a robot of a robotic welding system. The method includes acquiring a single image of a weldment having a weld seam in a regular camera view using a single image aperture of a depth camera of a weld assist tool, where the single image of the weldment captures marked symbols on the weldment. Again, the weld assist tool may be similar to the weld angle correction tool, or the weld assist tool may include the weld angle correction tool, in accordance with various embodiments. The method also includes performing optical character recognition on the marked symbols in the single image of the weldment, where a computer of the weld assist tool performs the optical character recognition, and where the optical character recognition provides welding information. The method further includes acquiring a single image of weldment depth data of the weldment having the weld seam using the depth camera of the weld assist tool. The method also includes processing the single image of the weldment depth data using the computer of the weld assist tool to determine 3D geometry information of the weldment. The welding information provided by the optical character recognition and the 3D geometry information inform a controller of the robotic welding system which portion of the weld seam the robotic welding system is to weld.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
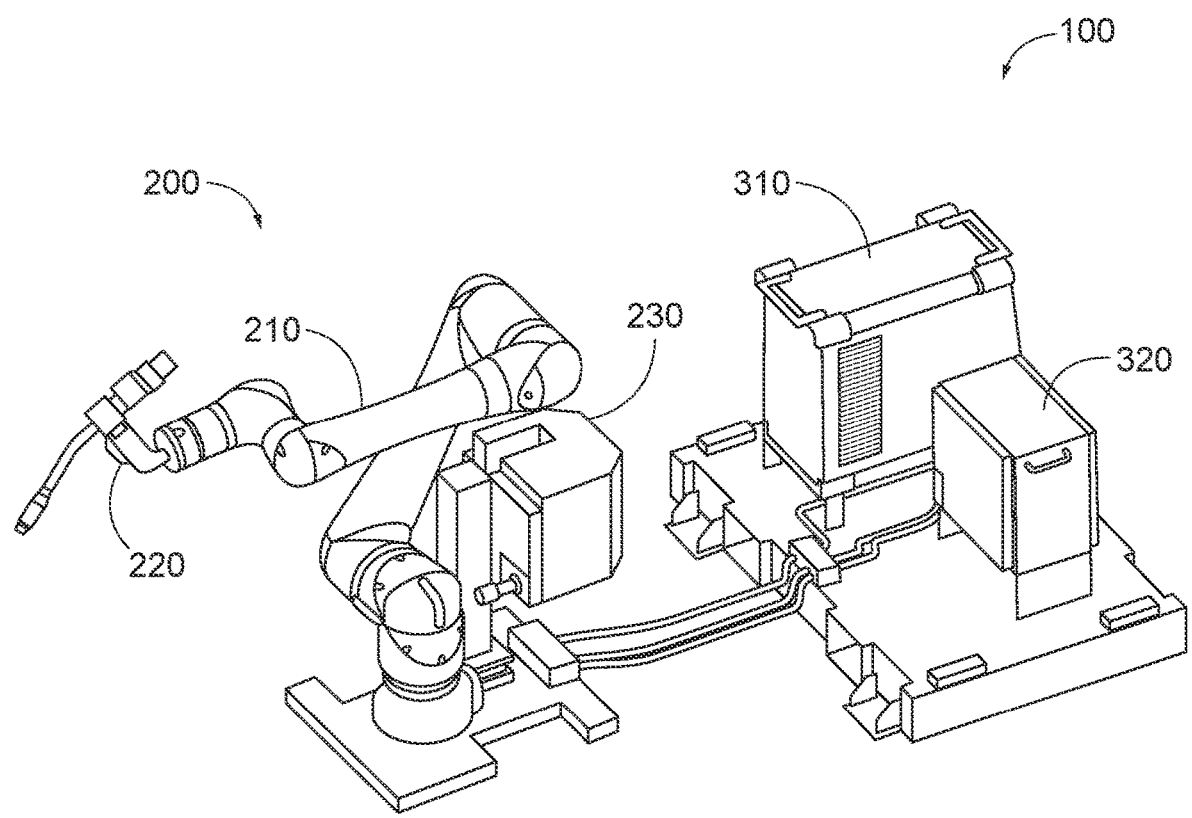
FIG. 1 illustrates one embodiment of a welding system having a robot (e.g., a collaborative robot)

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates one embodiment of a welding system 100 having a robot portion 200 (e.g., a collaborative robot). Although the discussion herein focuses on a welding system, the inventive concepts herein can apply equally well to a cutting system (e.g., a robotic plasma cutting system). Referring to FIG. 1, the welding system 100 includes a robot portion 200, a welding power supply 310, and a robot controller 320. The robot portion 200 has an arm 210 configured to hold a welding torch (e.g., a welding gun) 220. The terms "torch" and "gun" are used herein interchangeably. The robot portion 200 also includes a servo-mechanism apparatus 230 configured to move the arm 210 of the robot portion 200 under the command of the robot controller 320. In one embodiment, the welding system 100 includes a wire feeder (not shown) to feed consumable welding wire to the welding torch 220.

Figure 2:
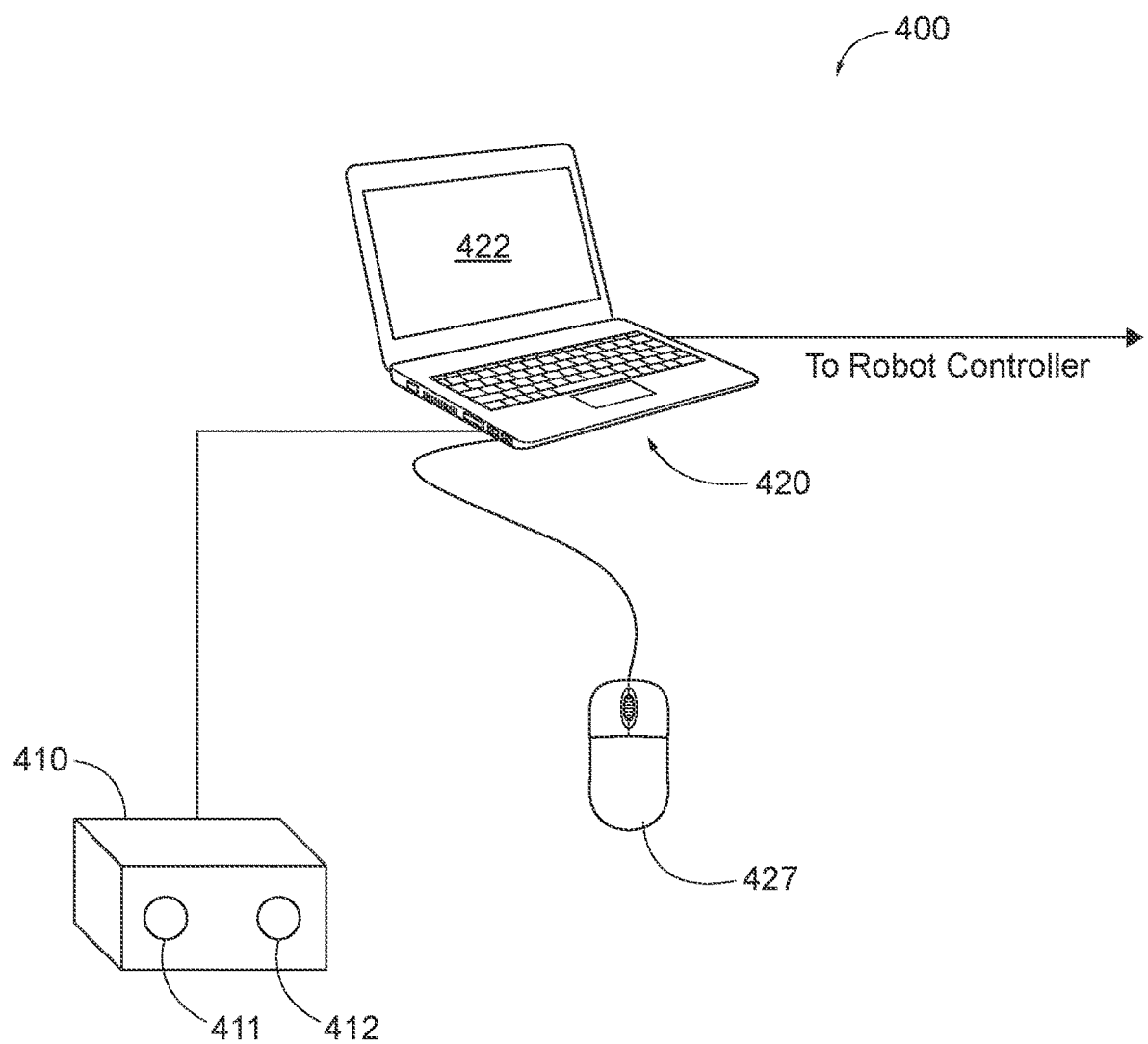
FIG. 2 illustrates one embodiment of a weld assist tool configured as a weld angle correction tool.

FIG. 2 illustrates one embodiment of a weld assist tool configured as a weld angle correction tool 400. The weld angle correction tool 400 includes a depth camera 410 and a computer device (e.g., a robot teach pendant or a laptop computer 420). The depth camera 410 has two imaging apertures 411 and 412 and is configured to acquire stereoscopic image data. The stereoscopic image data allows the depths of points in space to be determined. The stereoscopic image data is transmitted (via wired or wireless means) from the depth camera 410 to the laptop computer 420. As discussed later herein, the laptop computer 420 is programmed to convert the stereoscopic image data to 3D point cloud data, and then generate 3D plane/intersection data from the 3D point cloud data in the coordinate space of the robot (the robot coordinate space). In other embodiments, an alternative coordinate space may be defined and used.

When the user positions the robot arm 210 having the welding torch 220 connected thereto at a desired weld point of a weld joint/seam of a weldment (work piece), the robot controller 320 records the corresponding torch position and orientation data. The terms "weldment" and "work piece" are used interchangeably herein. The robot controller 320 transmits (via wired or wireless means) the user-placed torch position and orientation data, in the coordinate space of the robot, to the laptop computer 420. In accordance with other embodiments, the laptop computer 420 may be some other type of computer device or controller (e.g., having at least one processor) in some other form (e.g., a robot teach pendant). In one embodiment, the functionality of the laptop computer may be integrated into the robot controller 320, or in another embodiment, into the welding power supply 310.

Figure 3:
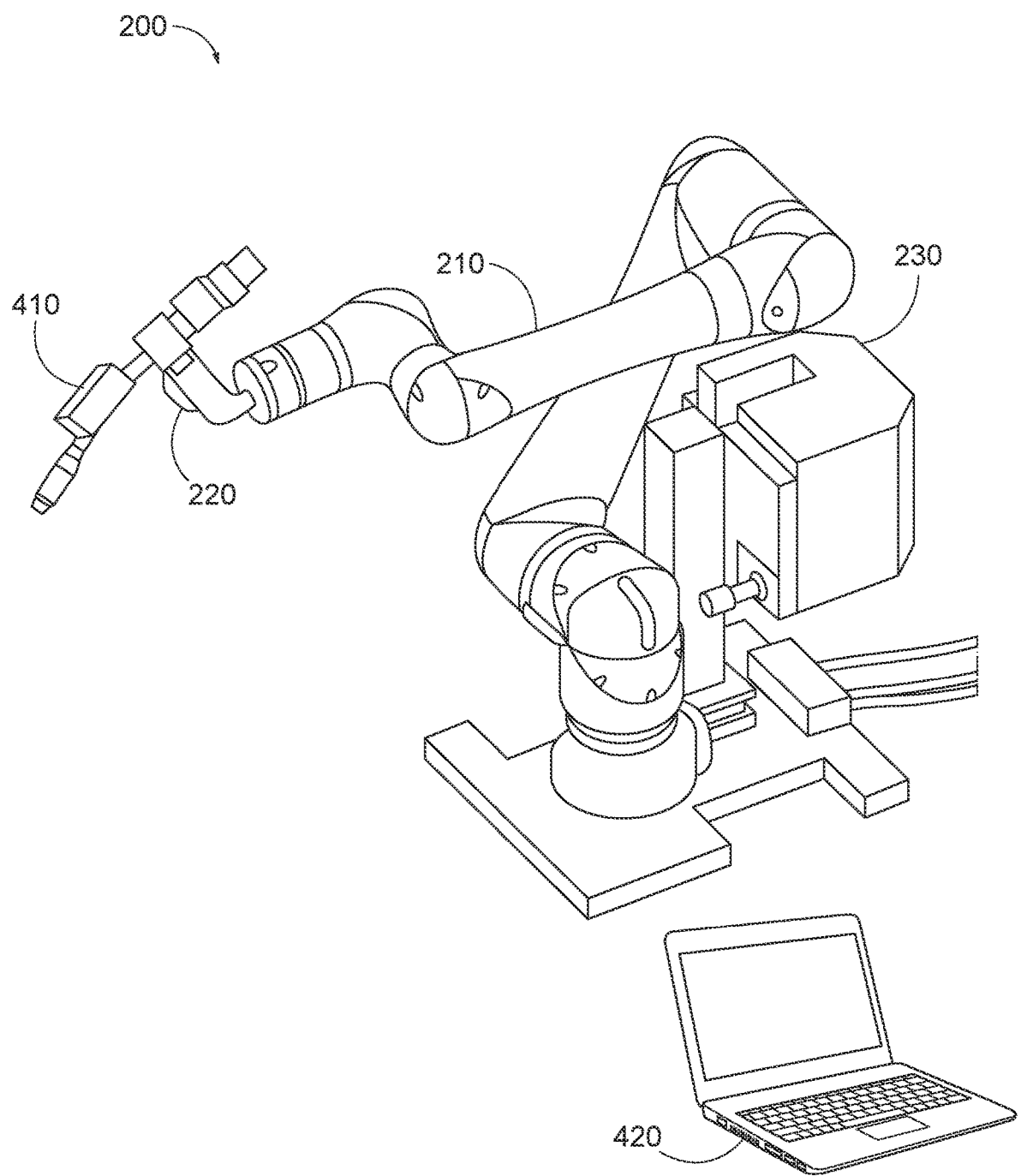
FIG. 3 illustrates a robot portion of the welding system of FIG. 1 operatively integrated with the weld angle correction tool of FIG. 2.

FIG. 3 illustrates a robot portion 200 of the welding system 100 of FIG. 1 operatively integrated with the weld angle correction tool 400 of FIG. 2. In the embodiment of FIG. 3, the depth camera 410 is mounted (e.g., removably attached to) the welding torch 220 behind a gas nozzle of the welding torch 220. In this manner, when the welding torch 220 is positioned at a desired weld point at a weld joint/seam of a weldment, the field of view of the depth camera 410 will include the weld point and a portion of the weldment (along with its weld joint/seam) surrounding the weld point. In another embodiment, the depth camera 410 may be mounted on joint 6 of the robot arm 210 (near a distal end of the robot arm 210). Other mounting positions are possible as well, in accordance with other embodiments. In the embodiment of FIG. 3, the laptop computer 420 communicates wirelessly (e.g., via Bluetooth® or Wi-Fi) with the depth camera 410 and the robot controller 320. In accordance with one embodiment, the position of the depth camera 410 is calibrated to, for example, the tip of the torch or a tool center point (TCP) of the robot (e.g., using an eye-hand calibration software). The depth camera 410 may be "hardened" to survive the welding environment.

Figure 4:
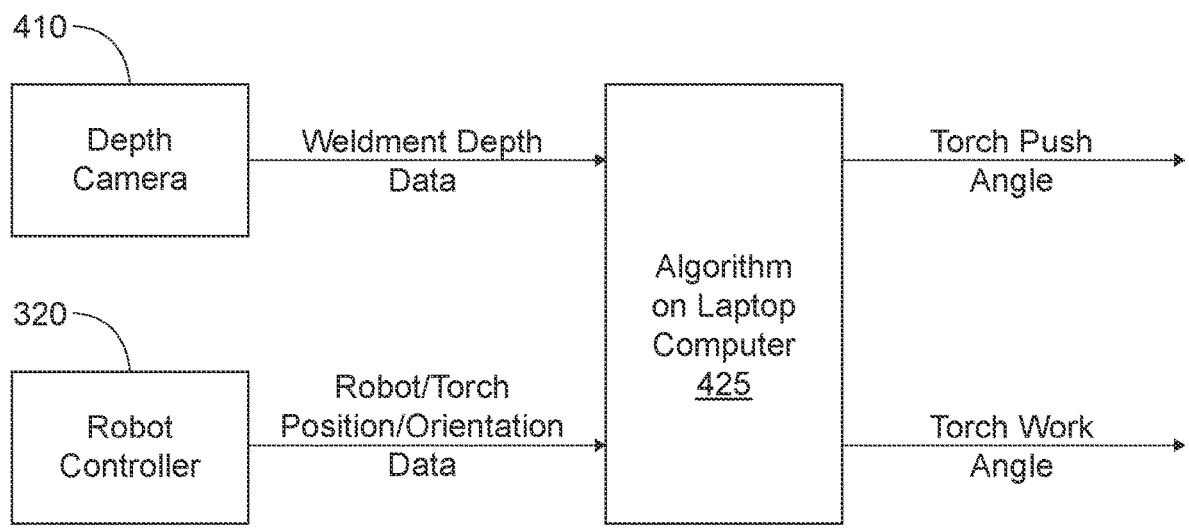
FIG. 4 illustrates a schematic block diagram of data inputs to and data outputs from an algorithm of the weld angle correction tool of FIG. 2 when operating with the welding system of FIG. 1.

FIG. 4 illustrates a schematic block diagram of data inputs to and data outputs from an algorithm 425 (or a set of algorithms or processes implemented in software and/or hardware) on the laptop computer 420 of the weld angle correction tool 400 of FIG. 2 when operating with the welding system 100 of FIG. 1. The algorithm 425 operates on two sets of input data being that of weldment joint/seam stereoscopic image data (depth data) from the depth camera 410 and robot torch position and orientation data from the robot controller 320. The algorithm 425 is programmed to convert the depth data to 3D point cloud data, and then generate 3D plane/intersection data from the 3D point cloud data in the coordinate space of the robot, for example. In accordance with one embodiment, the algorithm 425 uses matrix manipulation techniques, point cloud manipulation techniques, and feature recognition techniques. Upon operating on the two sets of input data (the depth data and the torch position/orientation data), the algorithm 425 generates a torch push angle and a torch work angle with respect to the weld joint/seam in the coordinate space of the robot. One skilled in the art of arc welding will understand the concepts of a torch push angle and a torch work angle.

The acquired depth data (in a single stereoscopic image) allows the weld angle correction tool 400 to determine, in three-dimensional detail, characteristics of the weldment joint/seam (i.e., what the geometry of weldment joint/seam looks like). Processing of the acquired depth data eliminates any need to use a touch-sensing technique to determine the geometry of the weldment joint/seam. Also, the robot controller 320 "knows" the recorded position and orientation of the torch with respect to the robot coordinate system, but not with respect to the position and orientation of the weldment/ work piece. Together, both the depth data and the robot torch position/orientation data allow the actual torch angles, as positioned by the user, to be determined. Other torch parameters (e.g., a stickout distance) may be determined from the weldment joint/seam depth data and/or the robot torch position/orientation data, in accordance with other embodiments.

Figure 5A:
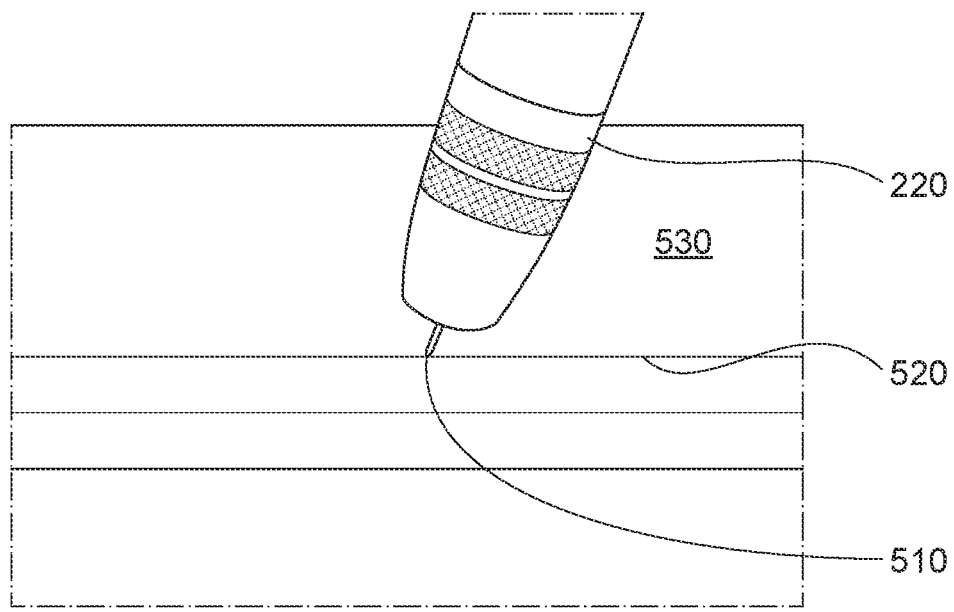
FIG. 5A illustrates a welding torch of the welding system that has been positioned by a user at a desired weld point at a joint/seam of a work piece at a non-ideal push angle.
Figure 5B:
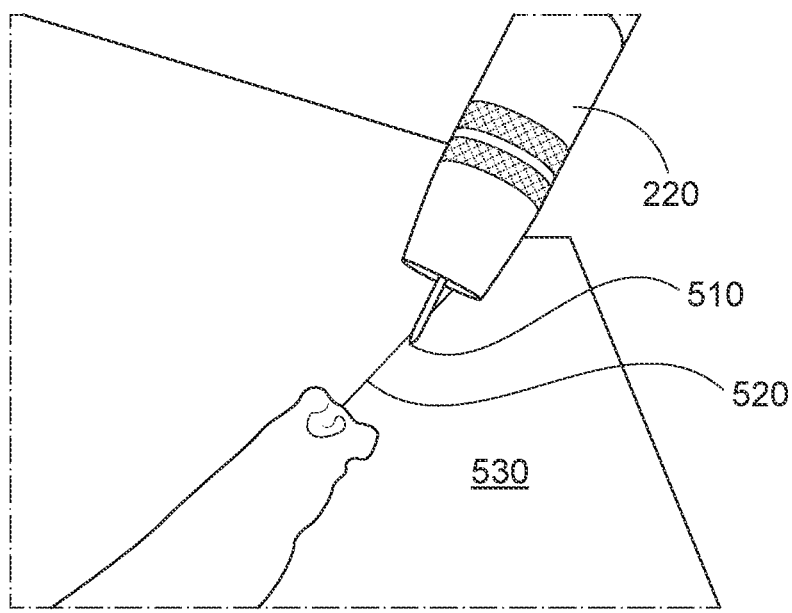
FIG. 5B illustrates the welding torch of FIG. 5A that has been positioned by the user at the desired weld point of the joint/seam of the work piece at a non-ideal work angle.

As an example, FIG. 5A illustrates a welding torch 220 of the welding system 100 that has been positioned by a user at a desired weld point 510 (which is recorded by the robot controller 320) at a joint/seam 520 of a work piece (weldment) 530. The welding torch is at a non-ideal push angle. Similarly, FIG. 5B illustrates the welding torch 220 of FIG. 5A that has been positioned by the user at the desired weld point 510 of the joint/seam 520 of the work piece 530 at a non-ideal work angle.

Figure 6:
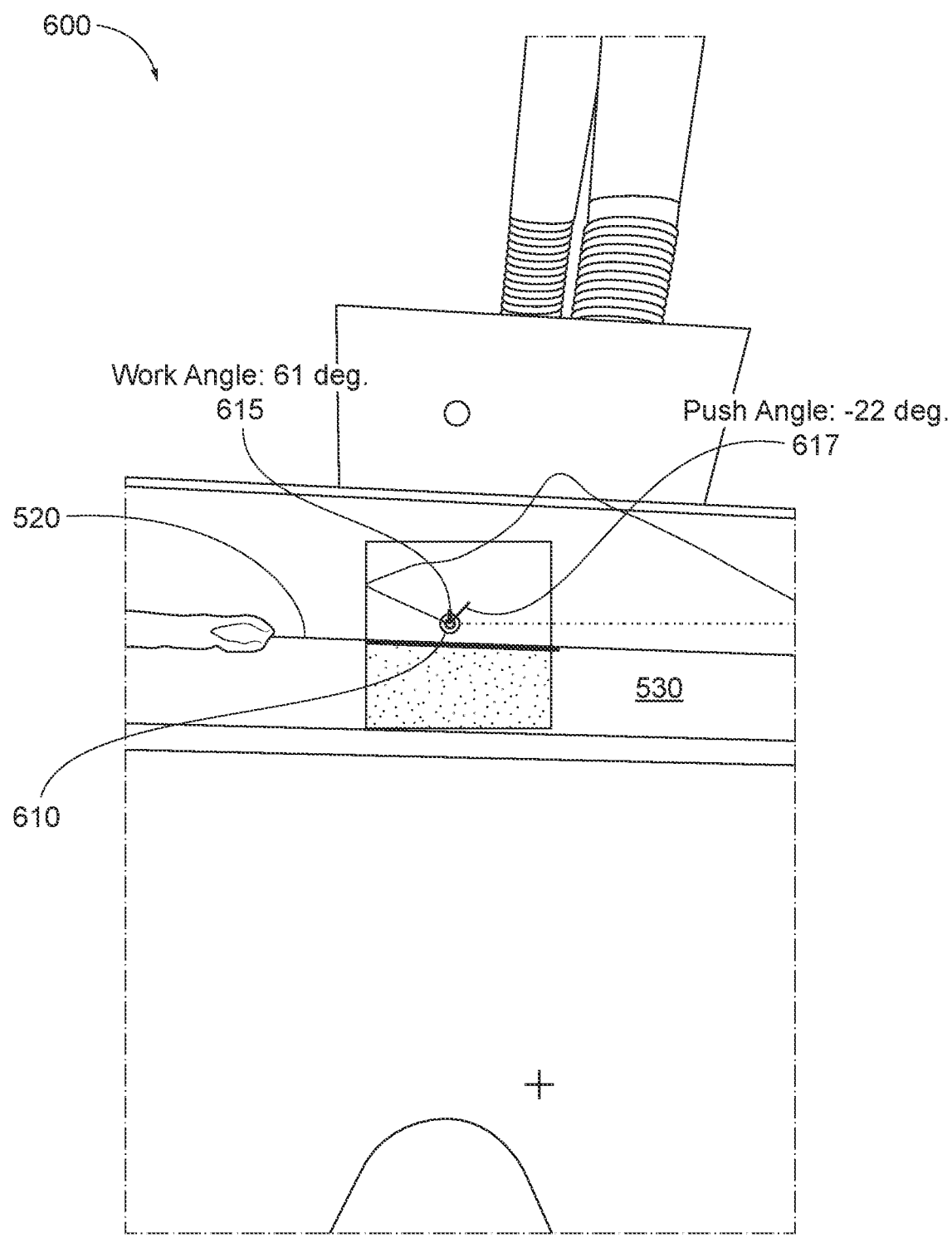
FIG. 6 illustrates a camera view, provided by the weld angle correction tool of FIG. 2, of the work piece and corresponding joint/seam showing the non-ideal angles of the welding torch, before angle correction, in an augmented reality manner.

In one embodiment, the depth camera 410 is also configured to provide a regular camera view (e.g., using only one image aperture of the two image apertures of the depth camera 410). For example, FIG. 6 illustrates a camera view 600 (provided by the weld angle correction tool 400 of FIG.

2 via the camera 410) of the work piece 530 and the corresponding joint/seam 520 showing the non-ideal angles of the welding torch 220, in an augmented reality manner, before angle correction has been performed. The camera view 600 is displayed on a display device 422 of the laptop computer 420. The AR reticle symbol 610 shows the location of the recorded weld point 510 with respect to the work piece 530 and the corresponding joint/seam 520. The work angle (represented by AR symbol 615) of the welding torch 220 (as positioned by the user and computed by the algorithm 425) is 61 degrees (non-ideal). The push angle (represented by AR symbol 617) of the welding torch 220 (as positioned by the user and computed by the algorithm 425) is −22 degrees (non-ideal). In this manner, a user can view the camera view 600 on a display device 422 of the laptop computer 420 along with AR symbols 610, 615, and 617 representing the weld point 510 and the non-ideal work and push angles. The computer 420 is configured (e.g., via hardware and software) to command the displaying of the various augmented reality symbols on the display device 422.

Figure 7:
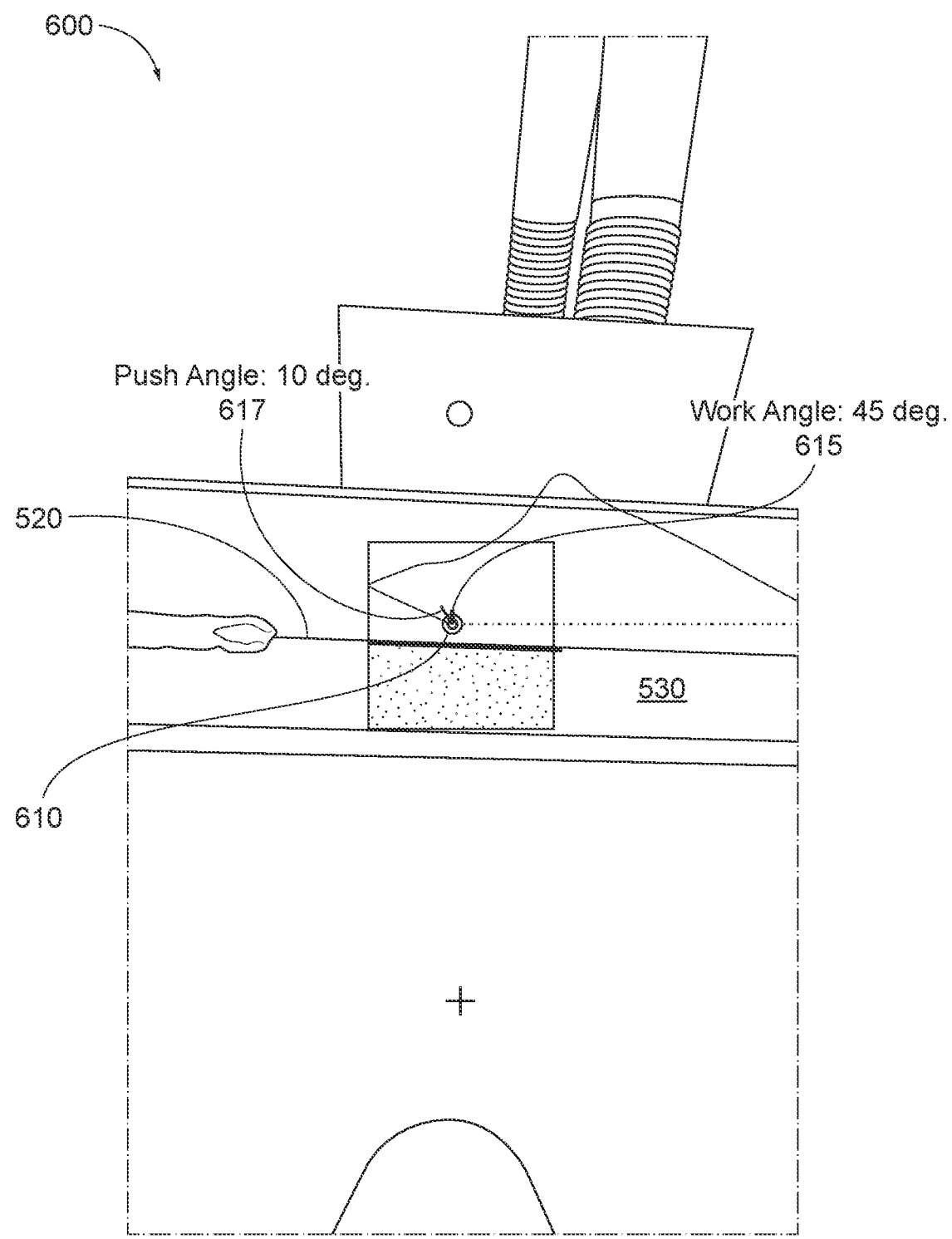
FIG. 7 illustrates the camera view, provided by the weld angle correction tool of FIG. 2, of the work piece and corresponding joint/seam showing the corrected/ideal angles of the welding torch, after angle correction, in an augmented reality manner.

FIG. 7 illustrates the camera view 600, provided by the weld angle correction tool 400 of FIG. 2, of the work piece 530 and the corresponding joint/seam 520 showing the corrected angles of the welding torch 220, in an augmented reality manner, after angle correction. For example, in one embodiment, the user selects the reticle symbol 610 in the camera view 600 (e.g., using a user interface 427 . . . e.g., a computer keyboard or a computer mouse) of the laptop computer 420. The user then commands the system (e.g., via a CNTL F command on the keyboard of the laptop computer 420) to correct the push angle and the work angle of the welding torch 220 at the weld point 510 to the ideal angles for the type of work piece 530 and joint/seam 520 with respect to the characteristics of the work piece 530 and joint/seam 520 (as characterized by the weld angle correction tool 400). The AR symbology now shows the corrected work angle symbol 615 representing 45 degrees, and the corrected push angle symbol 617 representing 10 degrees in FIG. 7.

The robot controller 320 "knows" the type of work piece and joint/seam. For example, in one embodiment, the weld angle correction tool 400 determines the type of work piece and joint/seam from the 3D point cloud data and informs the robot controller 320. The ideal angles are computed by the computer 420 of the weld angle correction tool 400 based on at least the weldment depth data, in one embodiment. In another embodiment, the type of work piece and joint/seam (along with ideal angles) is pre-stored in the robot controller 320. The laptop computer 420 communicates with the robot controller 320, and the robot controller 320 changes the recorded work angle (with respect to the work piece and joint/seam) to the ideal work angle of 45 degrees, and the recorded push angle (with respect to the work piece and joint/seam) to the ideal push angle of 10 degrees (as seen in the camera view 600 of FIG. 7).

Figure 8A:
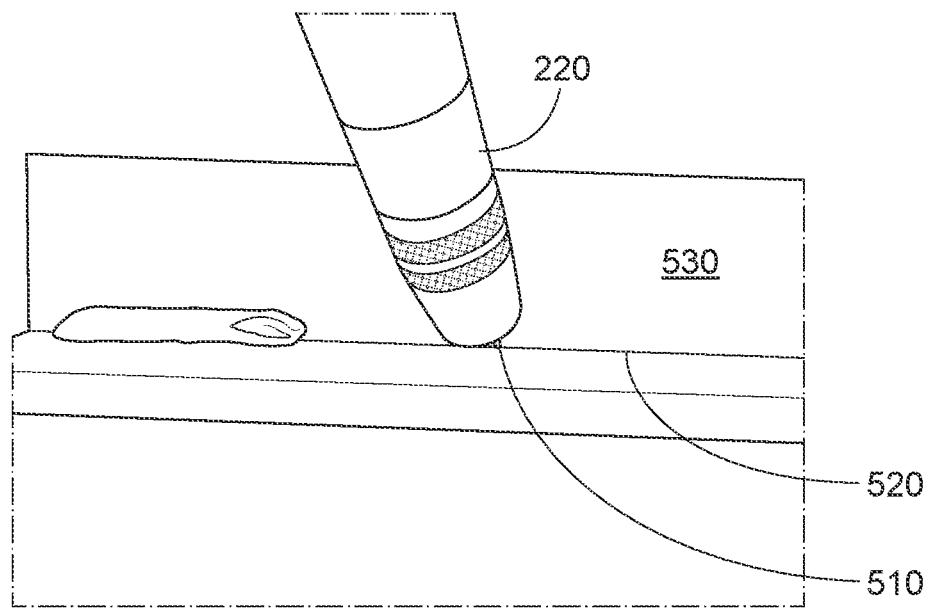
FIG. 8A illustrates the welding torch as corrected to the corrected/ideal push angle, with respect to the joint/seam of the work piece, by the robot of the welding system.
Figure 8B:
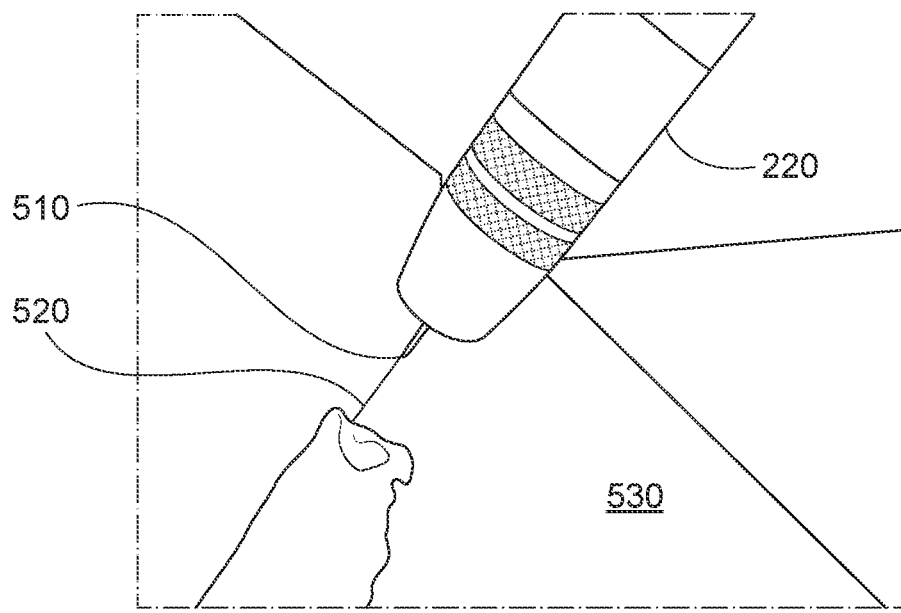
FIG. 8B illustrates the welding torch of FIG. 8A as corrected to the corrected ideal work angle, with respect to the joint/seam of the work piece, by the robot of the welding system.

The robot controller 320 may then command the robot arm 210 to re-position the welding torch 220 at the weld point 510, but with the corrected angles of 45 degrees and 10 degrees. FIG. 8A illustrates the welding torch 220 as corrected to the ideal push angle of 10 degrees, with respect to the joint/seam 520 of the work piece 530, by the robot of the welding system 100. FIG. 8B illustrates the welding torch 220 of FIG. 8A as corrected to the ideal work angle of 45 degrees, with respect to the joint/seam 520 of the work piece 530, by the robot of the welding system 100.

The weld angle correction tool 400 operates with the robotic welding system 100 in real time when teaching (training) the robot. In this manner, a user can position the tip of a welding torch at a desired weld point in a weld joint/seam, and then use the weld angle correction tool 400 to adjust the angles of the welding torch to the ideal angles for that type of work piece having a particular type of weld joint/seam. Therefore, the user of the welding system does not have to have detailed welding knowledge of how to set the various angles of the welding torch.

Figure 9:
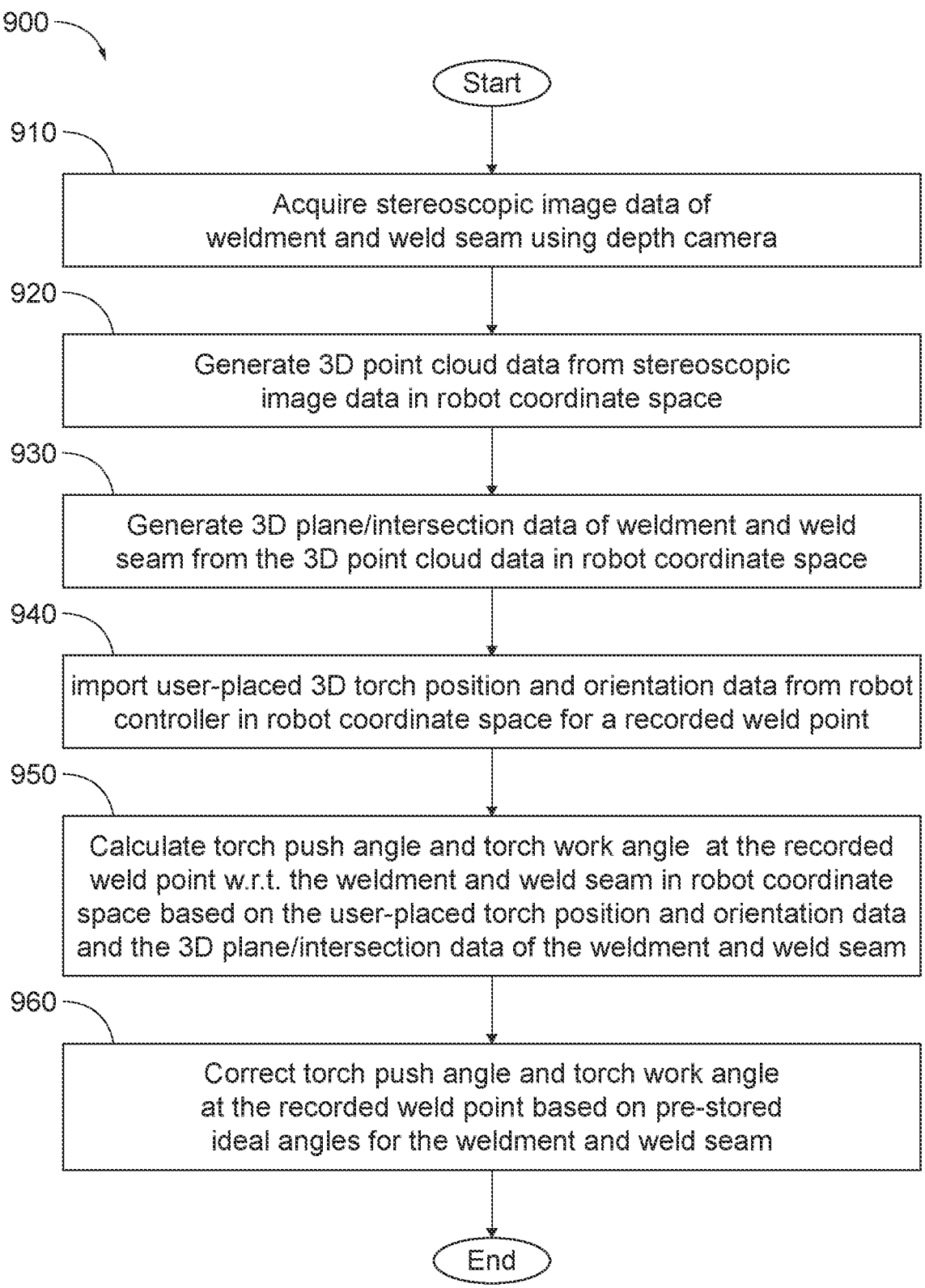
FIG. 9 is a flow chart of an embodiment of a method of correcting welding torch angles using the weld angle correction tool of FIG. 2 as operatively integrated with the welding system of FIG. 1.

FIG. 9 is a flow chart of an embodiment of a method 900 of correcting welding torch angles using the weld angle correction tool 400 of FIG. 2 as operatively integrated with the welding system 100 of FIG. 1. In general, a single stereoscopic depth image is used to reliably locate planes, plane intersections, and the extents of the plane intersection lines of the weldment and corresponding joint/seam in the 3D robot coordinate space. For example, in one embodiment, the weld angle correction tool uses one seam with two plane normals to calculate and display the current work angle, as set by the user, and also find the ideal work angle with respect to the joint/seam.

In step 910 of the method 900, stereoscopic image data of a weldment and its corresponding weld joint/seam are acquired using a depth camera of a weld angle correction tool. In step 920 of the method 900, a computer of the weld angle correction tool takes the stereoscopic image data and generates 3D point cloud data representing the weldment and its corresponding weld joint/seam in robot coordinate space. In step 930 of the method 900, the computer of the weld angle correction tool processes the 3D point cloud data to generate 3D plane and intersection data representative of the weldment and its corresponding weld joint/seam in robot coordinate space.

In step 940 of the method 900, the computer of the weld angle correction tool imports 3D torch position an orientation data from the robot controller. The 3D torch position and orientation data represent the position and orientation of the welding torch as positioned by the user at a recorded weld point along the weld joint/seam, in robot coordinate space. At step 950 of the method 900, the computer of the weld angle correction tool calculates a torch push angle and a torch work angle at the recorded weld point with respect to the weldment and its weld joint/seam in robot coordinate space. The computer of the weld angle correction tool uses the user-placed torch position and orientation data and the 3D plane and intersection data of the weldment and weld joint/seam to calculate the torch push angle and the torch work angle. At step 960 of the method 900, the robot controller, when commanded by the user via the weld angle correction tool, corrects the torch push angle and the torch weld angle at the recorded weld point with respect to the weldment and weld joint/seam based on pre-stored ideal angles for the weldment and its weld joint/seam. The ideal angles are stored in the robot controller, in accordance with one embodiment.

Other embodiments can provide additional capability as well. For example, in one embodiment, weld points can be defined by pointing the depth camera at the weld joint/seam and "clicking" on a point instead of moving the welding torch into the weld joint/seam. Furthermore, in a teach mode, the welding wire of the welding torch can be fully retracted and weld points can be taught to the system with the correct stickout using the depth camera, thus preventing the wire from being bent during teaching. Two-dimensional (2D) and three-dimensional (3D) wire search motion can be automatically defined using the detected planes. Inside corners at the start and end of a fillet weld can be detected and push angles can be modified to avoid crashing the robot into the weldment. The need for expensive, custom part fixturing can be eliminated by using AR guides to show the user where to place a part in front of the robot, and using the depth camera to teach features that accurately locate the part in space. In one embodiment, finding the intersection of three (3) seams can be used to quickly teach a part work object frame, allowing for easy program re-use between different robots, or making multiples of the same part. In one embodiment, small lap-joint seams can be detected and characterized using data acquired by the depth camera and an associated algorithm. In accordance with one embodiment, the welding angle correction tool uses a global gravity vector when setting weld angles. In this manner, the effects of gravity can be taken into account.

Figure 10:
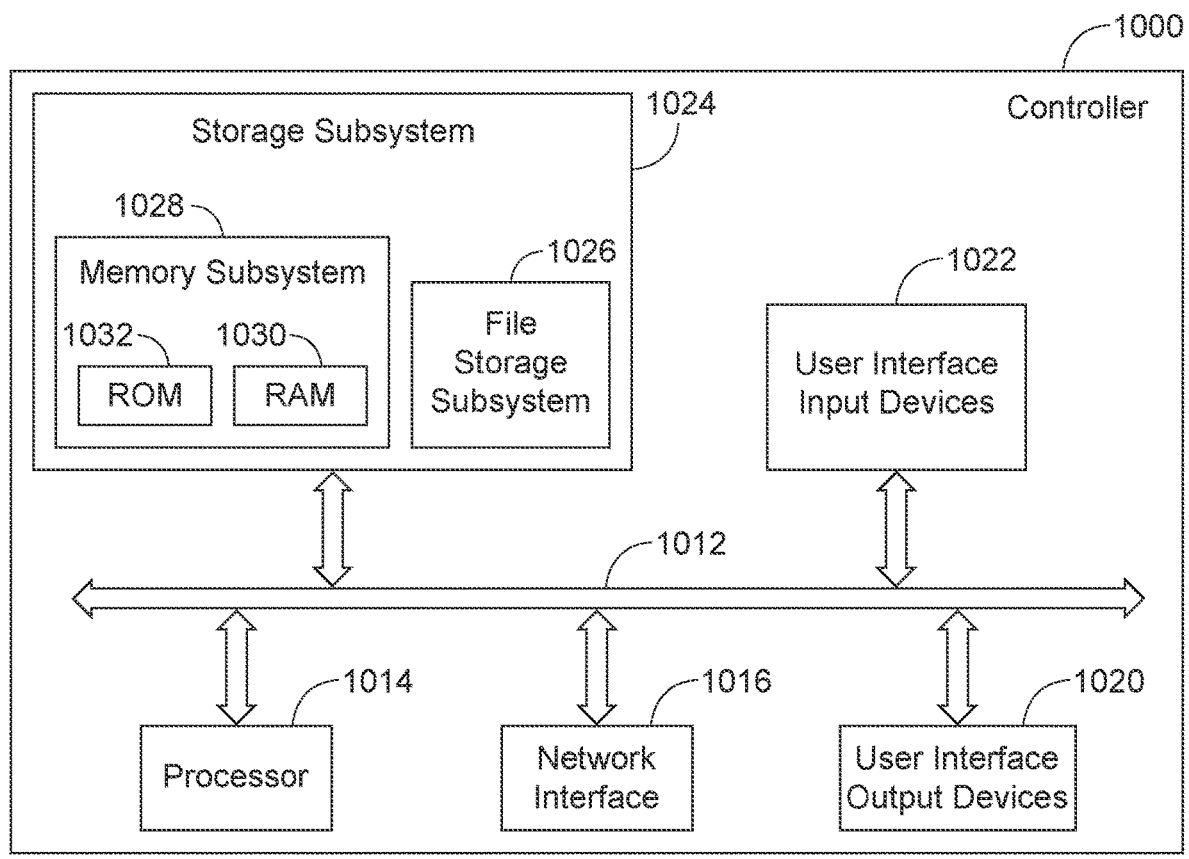
FIG. 10 illustrates a block diagram of an example embodiment of a controller that can be used, for example, in the welding system of FIG. 1.

FIG. 10 illustrates a block diagram of an example embodiment of a controller 1000 that can be used, for example, in the welding system 100 of FIG. 1. For example, the controller 1000 may be used as the robot controller 320 and/or as a controller in the welding power supply 310. Furthermore, the controller 1000 may be representative of the laptop computer 420 of FIG. 2, or of other computer platforms in other embodiments (e.g., a teach pendant) that perform much of the functionality of a weld assist tool such as the weld angle correction tool 400.

Referring to FIG. 10, the controller 1000 includes at least one processor 1014 (e.g., a microprocessor, a central processing unit, a graphics processing unit) which communicates with a number of peripheral devices via bus subsystem 1012. These peripheral devices may include a storage subsystem 1024, including, for example, a memory subsystem 1028 and a file storage subsystem 1026, user interface input devices 1022, user interface output devices 1020, and a network interface subsystem 1016. The input and output devices allow user interaction with the controller 1000. Network interface subsystem 1016 provides an interface to outside networks and is coupled to corresponding interface devices in other devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 1000 or onto a communication network.

User interface output devices 1020 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 1000 to the user or to another machine or computer system.

Storage subsystem 1024 stores programming and data constructs that provide some or all of the functionality described herein. For example, computer-executable instructions and data are generally executed by processor 1014 alone or in combination with other processors. Memory 1028 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 1026 in the storage subsystem 1024, or in other machines accessible by the processor(s) 1014.

Bus subsystem 1012 provides a mechanism for letting the various components and subsystems of the controller 1000 communicate with each other as intended. Although bus subsystem 1012 is shown schematically as a single bus, alternative embodiments of the bus subsystem may use multiple buses.

The controller 1000 can be of varying types. Due to the ever-changing nature of computing devices and networks, the description of the controller 1000 depicted in FIG. 10 is intended only as a specific example for purposes of illustrating some embodiments. Many other configurations of a controller are possible, having more or fewer components than the controller 1000 depicted in FIG. 10.

In accordance with one embodiment, once a torch angle(s) for a weld point on a weld seam has been taught/set and/or corrected, the weld angle correction tool can be used to command automatic application of that torch angle(s) (as taught/set and/or corrected) to the other defined weld points along the weld seam. For example, a torch angle(s) for a start point (or a first point) of the weld seam can be established and then automatically applied to the other weld points. This can be especially useful when the user is confident that all of the weld points along the weld seam should have the same torch angle(s).

For example, one embodiment of a method includes correcting angles of a welding torch positioned by a user while training a robot of a robotic welding system. The method includes acquiring a single image of weldment depth data of a weldment and a corresponding weld seam using a depth camera of a weld angle correction tool. The method also includes processing the weldment depth data using a computer of the weld angle correction tool. The method further includes importing user-placed 3D torch position and orientation data to the computer of the weld angle correction tool from a robot controller of a robotic welding system in a robot coordinate space for multiple recorded weld points along the corresponding weld seam. The method also includes calculating, using the computer of the weld angle correction tool, a torch angle for one recorded weld point of the multiple recorded weld points with respect to the weldment and the corresponding weld seam in the robot coordinate space based on the weldment depth data of the weldment and the corresponding weld seam, as processed by the computer of the weld angle correction tool, and the user-placed 3D torch position and orientation data. The method further includes correcting the torch angle for the one recorded weld point, resulting in a corrected torch angle for the one recorded weld point, based on pre-stored ideal angles for the weldment and the corresponding weld seam. The method also includes applying the corrected torch angle for the one recorded weld point to other weld points of the multiple recorded weld points along the corresponding weld seam.

In accordance with one embodiment, torch angles along a weld path can be corrected using information from a searching strategy (e.g., using a touch-sense scanning or searching strategy of the welding torch or a laser spot sensor) instead of using information acquired by the 3D depth camera. The touch-sense searching strategy is used to determine 3D position and orientation data of weld planes and corresponding weld seams of a weldment in a robot coordinate space of a robotic welding system. Then the act of correcting the torch angles for the weld points along the seams would be the same as discussed herein, using the welding angle correction tool. U.S. Published Patent Application No. 2020/0139474 A1, which is incorporated herein by reference, discusses some aspects of such touch-sensing scanning/searching techniques.

For example, one embodiment includes a method of correcting angles of a welding torch positioned by a user while training a robot of a robotic welding system. The method includes determining 3D position and orientation data of a weld plane and a corresponding weld seam of a weldment in a robot coordinate space of a robotic welding system using a touch-sense searching strategy. The method also includes importing user-placed 3D torch position and orientation data to a computer of a weld angle correction tool from a robot controller of the robotic welding system in the robot coordinate space for a recorded weld point along the corresponding weld seam. The method further includes calculating, using the computer of the weld angle correction tool, a torch angle for the recorded weld point with respect to the weldment and the corresponding weld seam in the robot coordinate space based on the 3D position and orientation data of the weld plane and the corresponding weld seam of the weldment, and further based on the user-placed 3D torch position and orientation data. The method also includes correcting the torch angle for the recorded weld point based on pre-stored ideal angles for the weldment and the corresponding weld seam.

Figure 11:
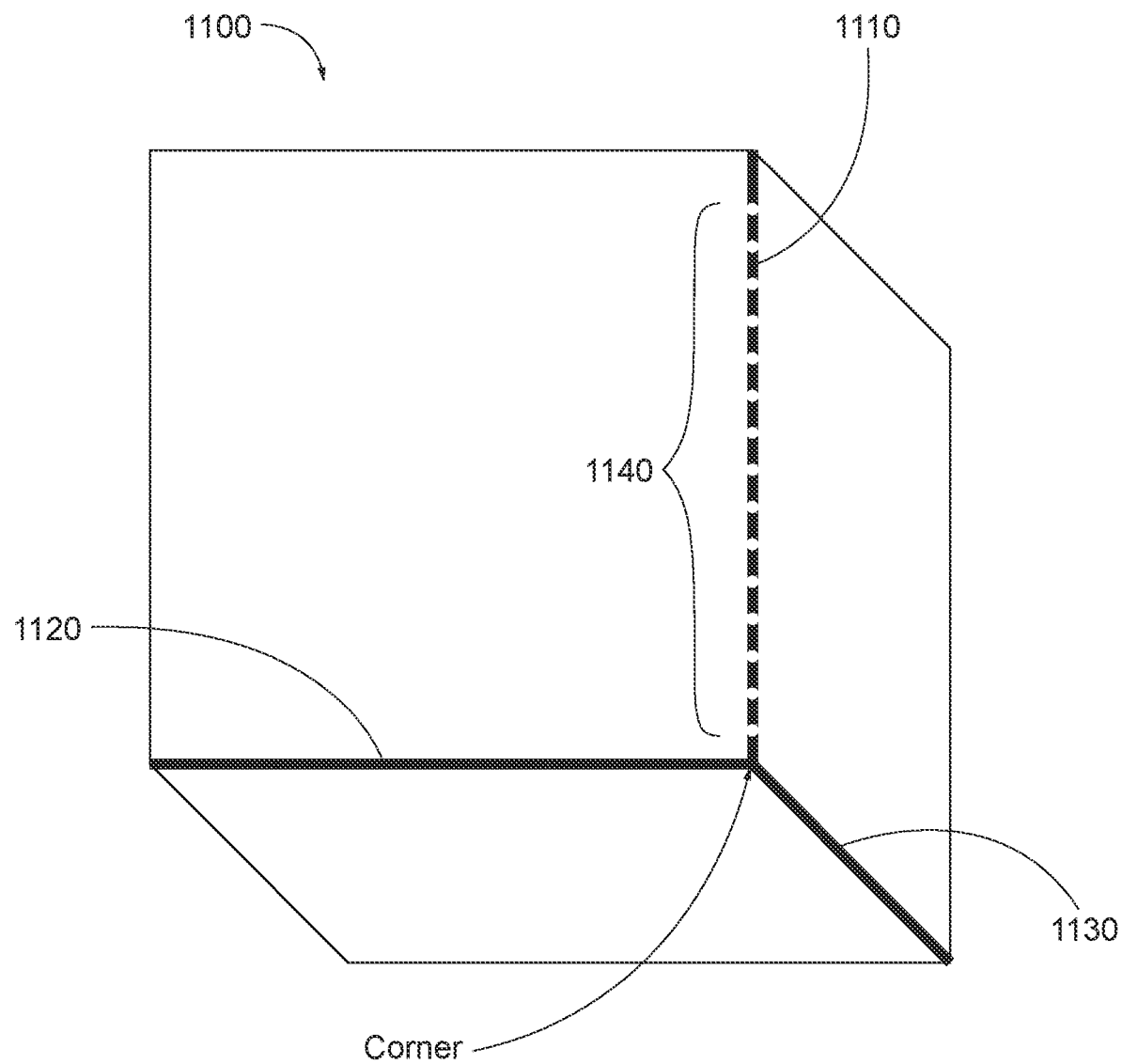
FIG. 11 illustrates an embodiment of a 3D corner feature of a part to be welded.

FIG. 11 illustrates an embodiment of a 3D corner feature 1100 of a part to be welded. A corner feature may be an outside corner feature or an inside corner feature, for example. In accordance with one embodiment, the 3D depth camera can be used to acquire data for any 3D corner feature of a part to be welded. Augmented reality lines 1110, 1120, and 1130 (thick dark solid lines in FIG. 11) can be overlaid onto the corner feature seams as the corner feature is being displayed. A full 3-axis weld frame can be defined in this manner. The same reticle method that is used to select weld points can be used to select points 1140 along the seams (white dots along the overlaid augmented reality line 1110 in FIG. 11) to define a weld path along the seam. In this way, a weld path can be defined without having to actually move the torch into the seam during path planning. The seams of the corner feature 1100 are found and the weld points are selected by the user along the seams to create defined weld paths. The weld angle correction tool may then be used to set the weld angles for each weld point. In one embodiment, the push angle is based on which weld point the user placed (selected) first and which weld point the user placed (selected) second along a given seam. This could replace having to manually place the torch in the seam at the various points, or it could be used to supplement the manual placing of the torch. For example, the user could place the torch at various points and then use the tool to tweak the positions of the points along the seam (or the user can select a point with the tool, command the torch to that point, and then manually tweak the position of that point by moving the torch).

Figure 12:
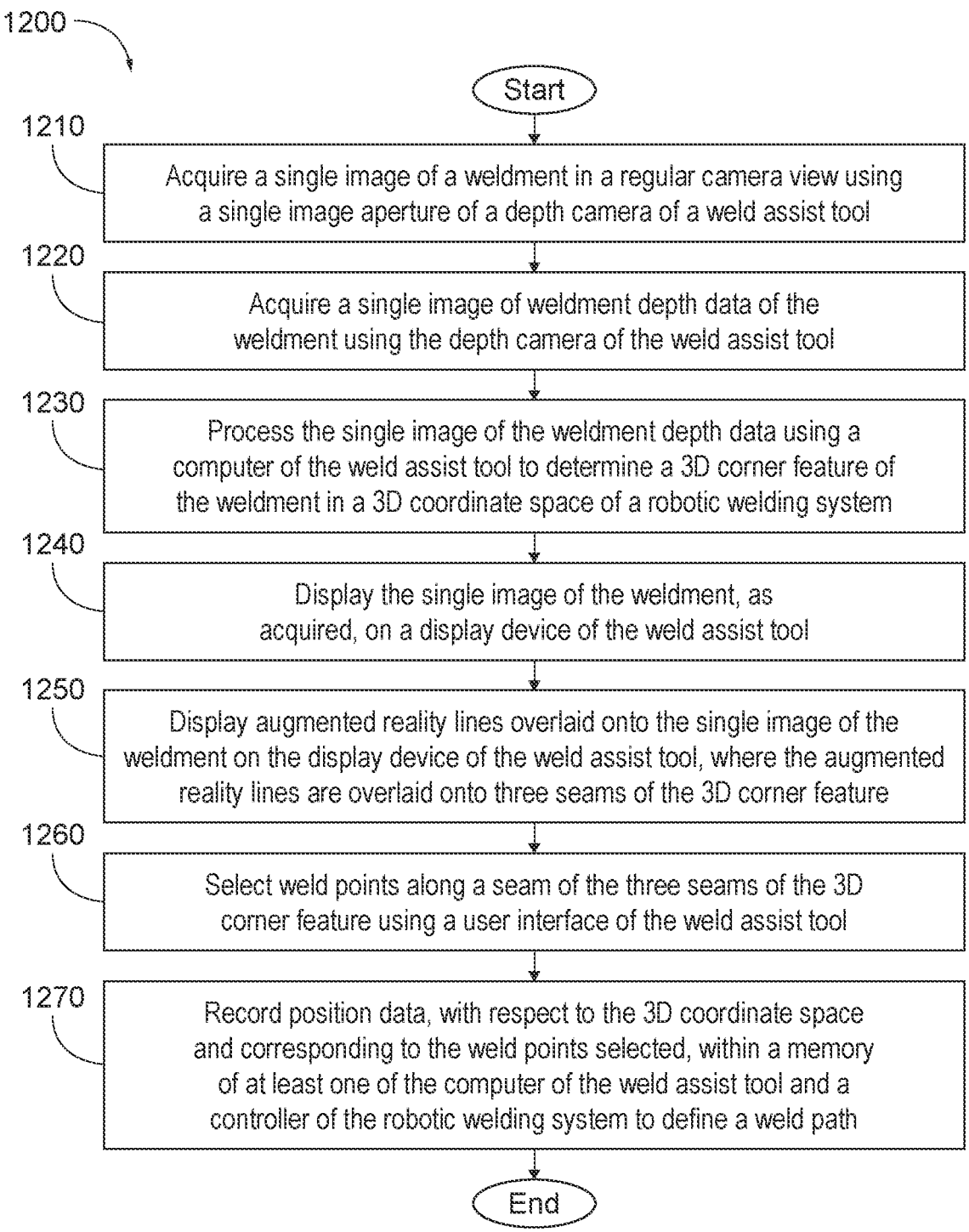
FIG. 12 illustrates one embodiment of a method to support training of a robot of a robotic welding system.

FIG. 12 illustrates one embodiment of a method 1200 to support training of a robot of a robotic welding system. The method includes, at blocks 1210 and 1220, acquiring a single image of a weldment in a regular camera view using a single image aperture of a depth camera of a weld assist tool, and acquiring a single image of weldment depth data of the weldment using the depth camera of the weld assist tool. The weld assist tool may be similar to the weld angle correction tool, or the weld assist tool may actually be or include the weld angle correction tool, in accordance with various embodiments. At block 1230 of the method, the method includes processing the single image of the weldment depth data using a computer of the weld assist tool to determine a 3D corner feature (e.g., 1100 in FIG. 11) of the weldment in a 3D coordinate space of a robotic welding system. At block 1240, the method includes displaying the single image of the weldment, as acquired, on a display device of the weld assist tool. At block 1250, the method includes displaying augmented reality lines (e.g., 1110, 1120, 1130 in FIG. 11) overlaid onto the single image of the weldment on the display device of the weld assist tool, where the augmented reality lines are overlaid onto seams (e.g., three seams) of the 3D corner feature. At block 1260, the method includes selecting weld points (e.g., 1140 in FIG. 11) along a seam (e.g., 1110 in FIG. 11) of the 3D corner feature using a user interface of the weld assist tool. At block 1270, the method includes recording position data, with respect to the 3D coordinate space and corresponding to the weld points as selected, within a memory of the computer of the weld assist tool and/or a controller of the robotic welding system to define a weld path. The defined weld path can be used by the robot controller to generate a motion program for welding.

In accordance with one embodiment, multiple frames of depth camera data of a part can be collected and 3D digital models of the part can be built from the depth camera data. The 3D digital models can be used, for example, to help with collision avoidance when the robot arm is moved within the welding environment (e.g., using free-space data, 3D digital models of the part, and robot arm digital data represented in space by, for example, cylinders and rectangles in 3D space).

Figure 13A:
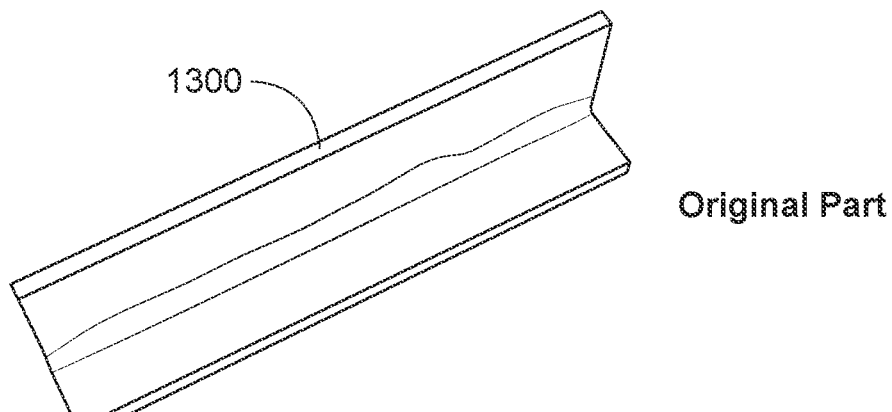
FIG. 13A illustrates one embodiment of a part (original part) to be welded.
Figure 13B:
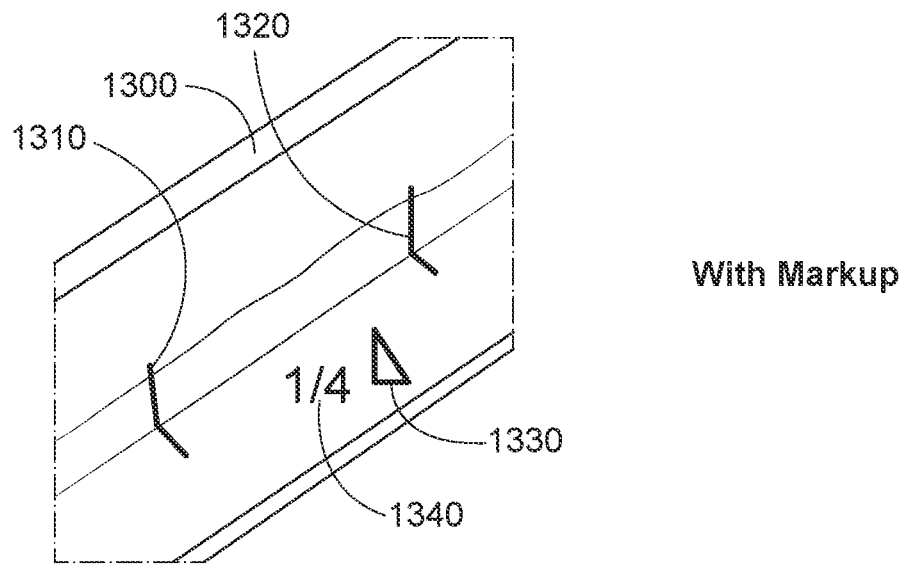
FIG. 13B illustrates one embodiment of a marked-up portion of the part of FIG. 13A.
Figure 13C:
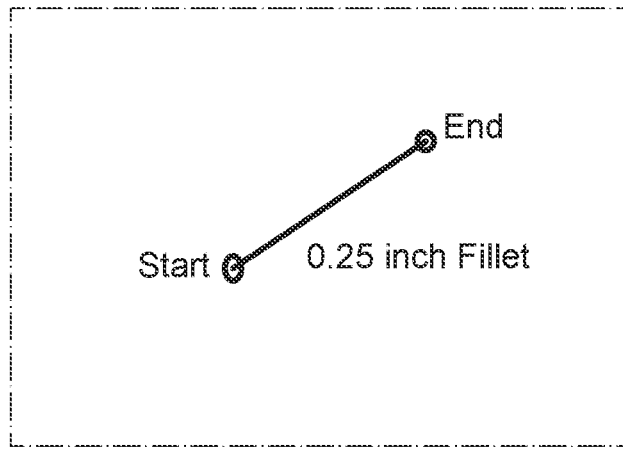
FIG. 13C illustrates one embodiment of how a robotic system views and interprets the marked-up portion of the part of FIG. 13B.

FIG. 13A illustrates one embodiment of a part 1300 (an original part) to be welded, FIG. 13B illustrates one embodiment of a marked-up portion of the part 1300 of FIG. 13A, and FIG. 13C illustrates one embodiment of how a robotic system views and interprets the marked-up portion of the part 1300 of FIG. 13B. In accordance with one embodiment, a user can mark up a part 1300 to be welded with, for example, a paint pen. The user can position the welding torch, with the 3D depth camera attached to it, at the part 1300 such that the markups (symbols) are within a field-of-view of the camera. The depth camera determines the geometry of the part as previously described herein. The camera views the markups (symbols) and the robotic system (e.g., a computer of a weld adjust tool or a controller of a cobot system) performs an optical character recognition process on the viewed markups (symbols). The markups inform the robotic system (in combination with the 3D geometry information provided by the depth camera) which portion of which weld seam the user wants the robotic system to weld. The 3D geometry information tells the robotic system where the weld seam is in space, and the markups (symbols) provide welding information, telling the robotic system where and how on the weld seam the system should weld (e.g., weld start and stop positions, type of weld (e.g., a fillet weld), the size of the weld, a weld travel direction, a type of process to use). The robotic system can then generate a robotic program (motion program) from that information. The markups (symbols) can be a unique code that is interpreted by the robotic system (does not have to follow any standard or existing part markup code). FIG. 13B shows examples of a start symbol 1310, an end symbol 1320, a fillet symbol 1330, and a fillet size symbol 1340 (¼ inch fillet) which are optically read and interpreted by the controller of the robotic system. The robotic system can also be configured to read, for example, bar codes and/or QR codes which may convey other types of information. When the 3D depth camera is a color depth camera (R, G, B, D), symbols may be color-coded as well to provide information about the weld.

Figure 14:
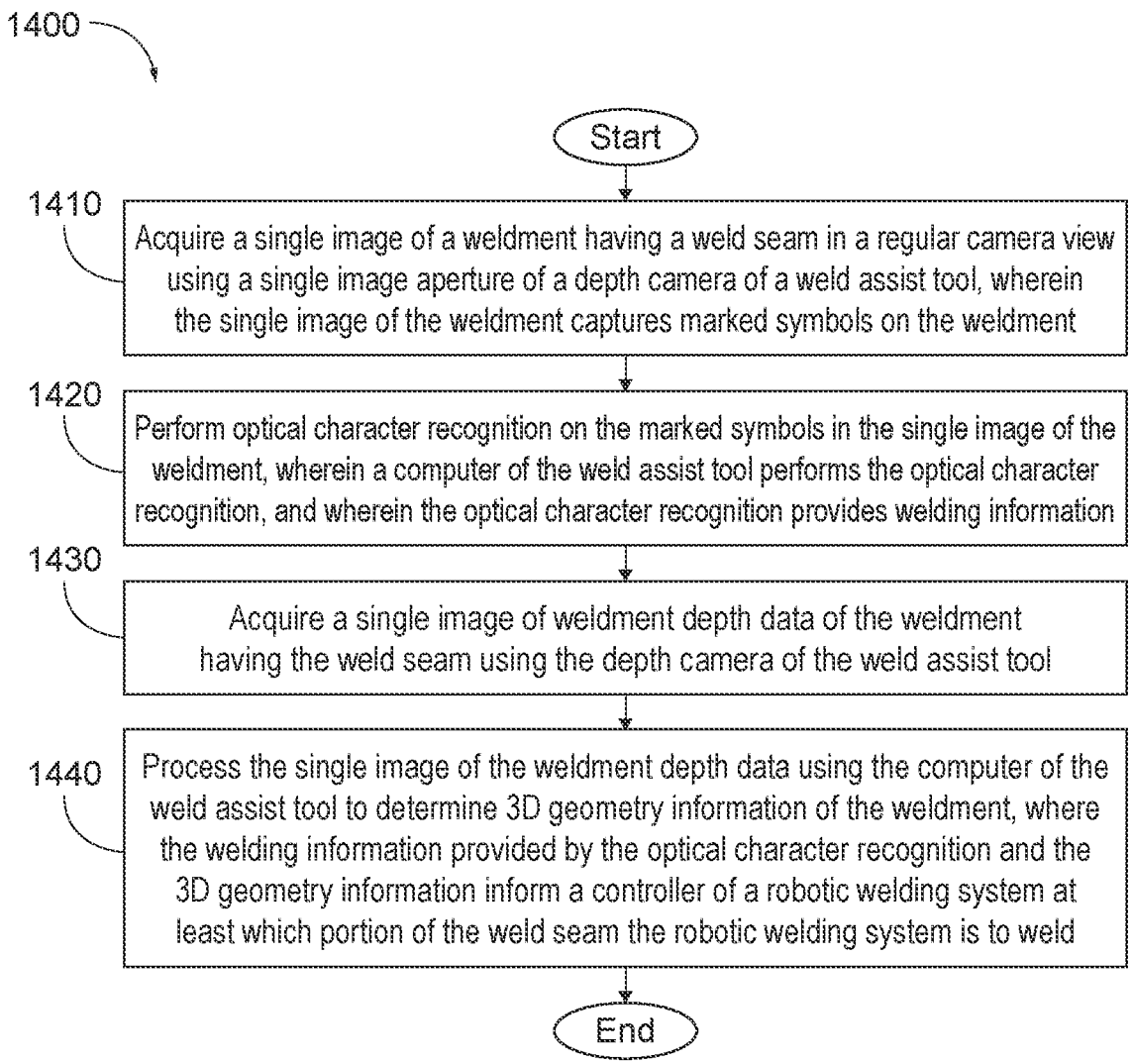
FIG. 14 illustrates one embodiment of a method to support training of a robot of a robotic welding system.

FIG. 14 illustrates one embodiment of a method 1400 to support training of a robot of a robotic welding system. The method includes, at block 1410, acquiring a single image of a weldment having a weld seam in a regular camera view using a single image aperture of a depth camera of a weld assist tool, where the single image of the weldment captures marked symbols on the weldment. Again, the weld assist tool may be similar to the weld angle correction tool, or the weld assist tool may be or include the weld angle correction tool, in accordance with various embodiments. At block 1420, the method includes performing optical character recognition on the marked symbols in the single image of the weldment, where a computer of the weld assist tool performs the optical character recognition, and where the optical character recognition provides welding information. At block 1430, the method includes acquiring a single image of weldment depth data of the weldment having the weld seam using the depth camera of the weld assist tool. At block 1440, the method includes processing the single image of the weldment depth data using the computer of the weld assist tool to determine 3D geometry information of the weldment. The welding information provided by the optical character recognition, and the 3D geometry information, inform a controller of a robotic welding system at least which portion of the weld seam the robotic welding system is to weld.

In one embodiment, weld torch angle tools are provided to present an operator with the work angle and travel angle measures as taught in the weld point. The weld torch angle tools may be accessed via an application of the weld angle correction tool as weld torch angle software application tools, in accordance with one embodiment. The display screen 422 (see FIG. 2) can display the various user interface screen shots of weld torch angle tools within an application of the weld angle correction tool 400. The operator can use the user interface 427 (mouse and/or keyboard of the laptop computer 420) to interact with the displayed screen shots. Alternatively, the display screen 422 may be a touch screen display acting as a user interface.

The operator is presented with "buttons" or "icons" to make small adjustments which the robot will move to in live updates to independently tune each angle. If the base plate is tilted, a workflow is provided to the operator to teach that tilt to the robot, allowing the measured angles and axes to be adjusted accordingly. This allows the operator to accurately dial in the exact angle measures (e.g., to within one degree) specified for a given weld (at least to within one degree) and to visually confirm the validity of the weld point as adjusted, to prevent any unexpected collision or robot reach issues. In one embodiment, an application of the weld torch angle tools calculates the weld frame and the orientation of the torch with respect to the weld frame. The orientation is parsed into a work angle measurement and a travel angle measurement and presented to the operator. Adjustment tools are provided to allow the operator to fine tune the work and travel angles, moving the robot at the same time to allow visual inspection as well as numeric measurements. Again, for weld plates that are tilted, a workflow is available to allow the operator to adjust the measured angles based on the tilt. Once the operator is satisfied, the weld point can be saved with the fine-tuned location.

Figure 15:
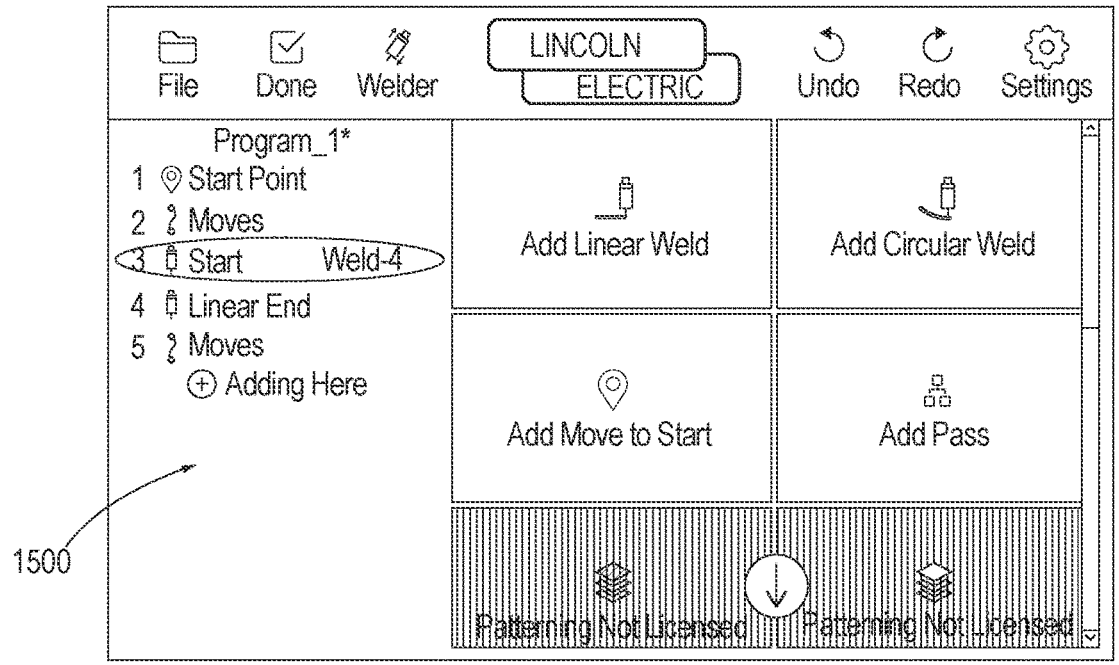
FIG. 15 illustrates one embodiment of a screen shot of a user interface of a weld angle correction tool configured to allow a user to select a weld block.
Figure 16:
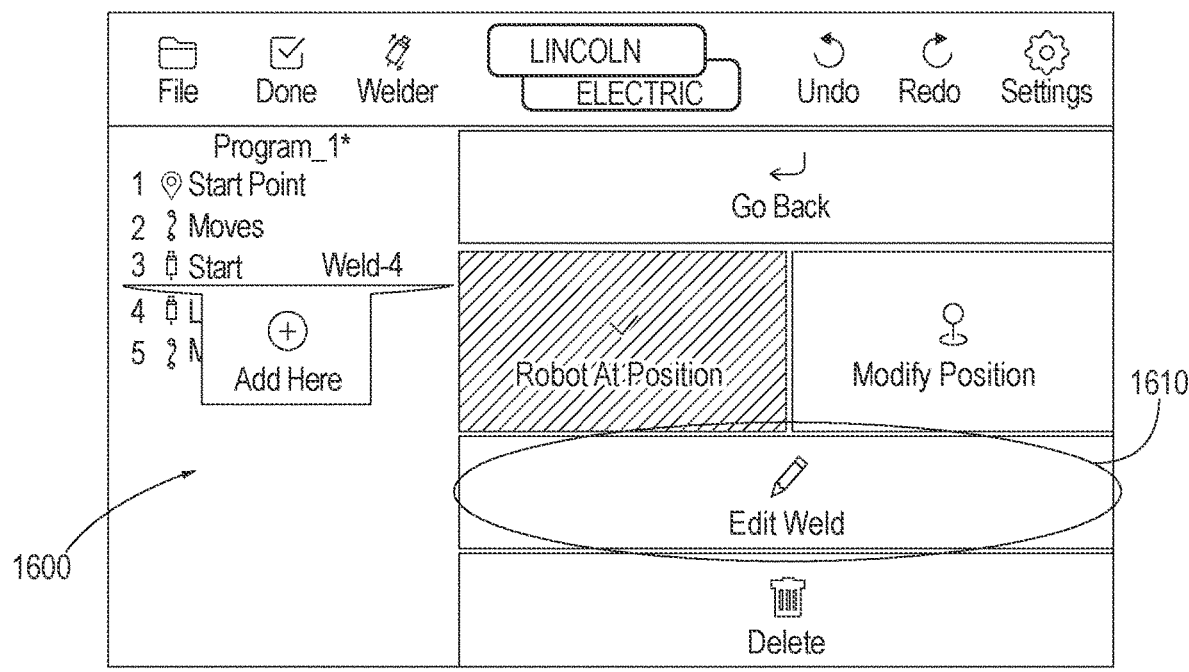
FIG. 16 illustrates one embodiment of a screen shot of a user interface of a weld angle correction tool configured to allow a user to edit a weld.
Figure 17:
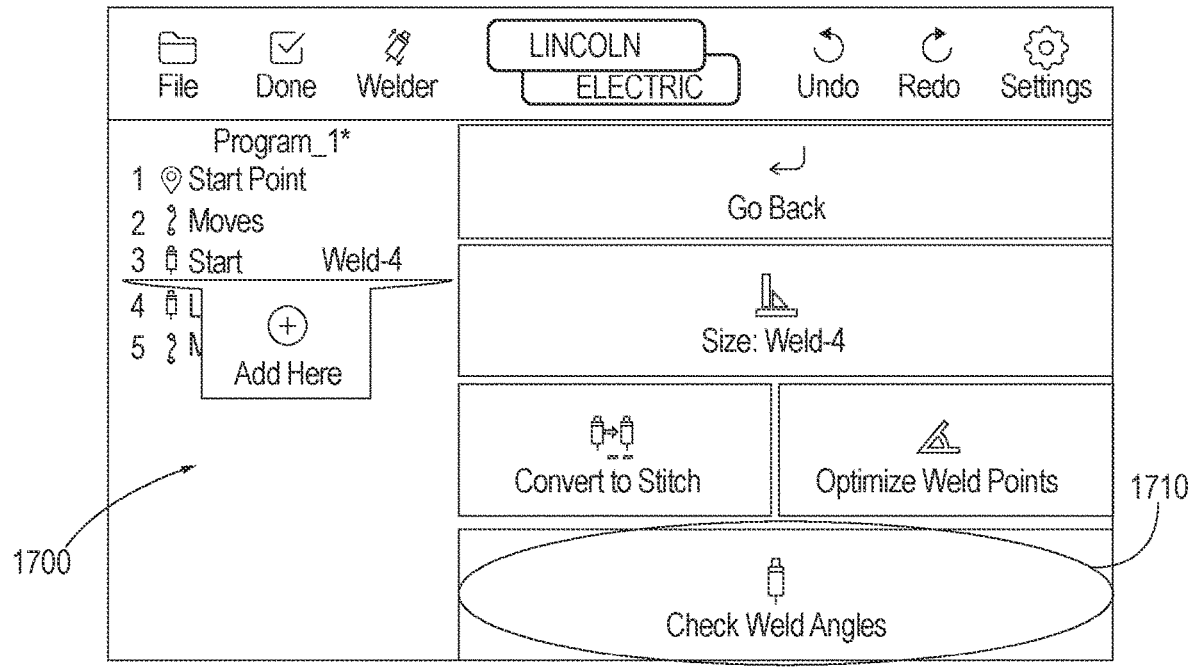
FIG. 17 illustrates one embodiment of a screen shot of a user interface of a weld angle correction tool configured to allow a user to check weld angles.
Figure 18:
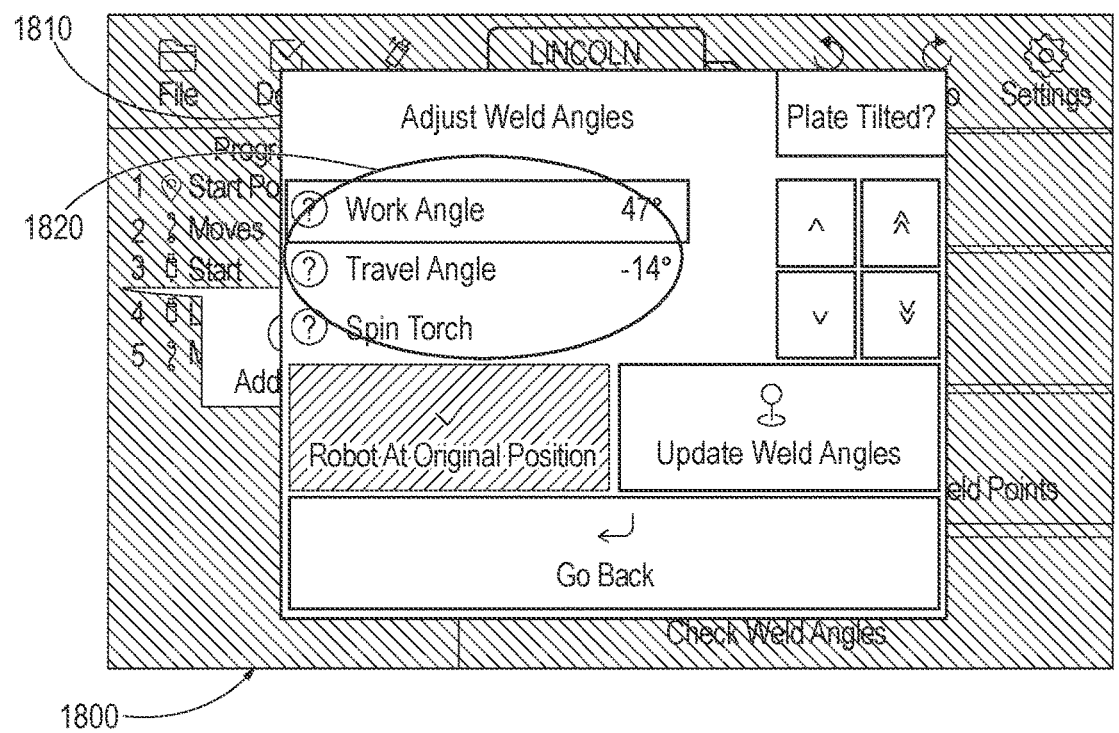
FIG. 18 illustrates one embodiment of a screen shot of a user interface of a weld angle correction tool showing angle selection rows.

In one embodiment (to access the weld torch angle tools within an application of the weld angle correction tool) at least two weld points are to be taught. FIG. 15 illustrates one embodiment of a screen shot 1500 of a user interface of a weld angle correction tool configured to allow a user to select a weld block. FIG. 16 illustrates one embodiment of a screen shot 1600 of a user interface of a weld angle correction tool configured to allow a user to edit a weld. A welding point can be selected to bring up the information screen for that welding point as shown in FIG. 16. Pushing the "Edit Weld" button 1610 as shown in FIG. 16 brings up additional options for editing the weld. FIG. 17 illustrates one embodiment of a screen shot 1700 of a user interface of a weld angle correction tool configured to allow a user to check weld angles. Pushing the "Check Weld" button 1710 as shown in FIG. 17 opens the Adjust Weld Angles window 1810 as shown in FIG. 18. Within the Adjust Weld Angles window 1810 are all the buttons a user needs to interact with the tool.

Figure 26:
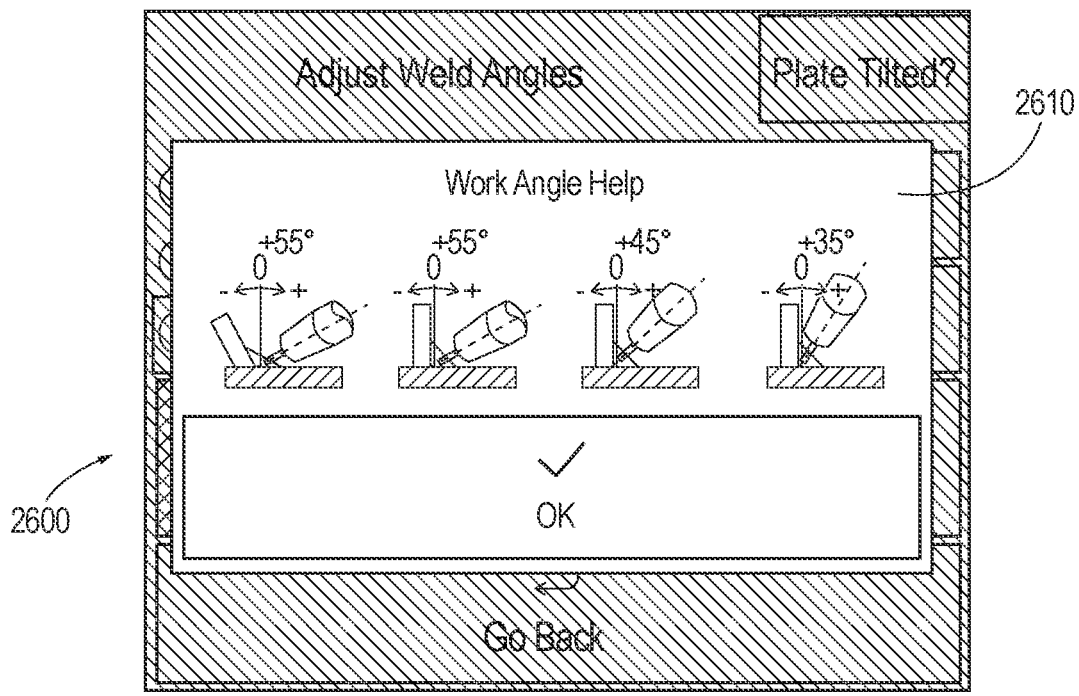
FIG. 26 illustrates one embodiment of a screen shot of a user interface of a weld angle correction tool showing a work angle help popup.
Figure 27:
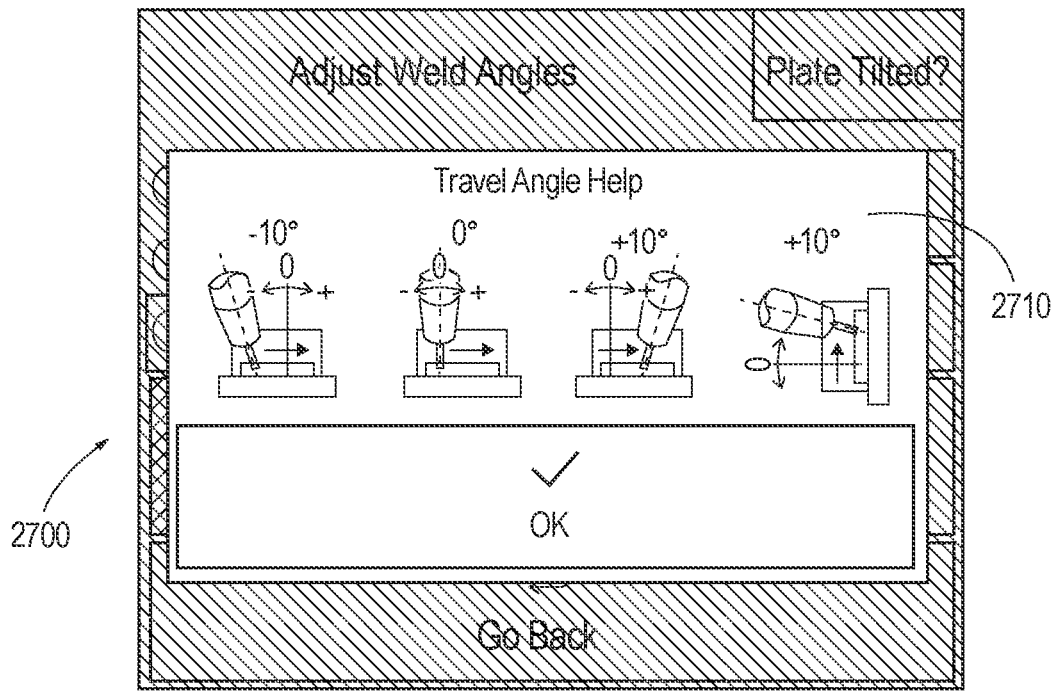
FIG. 27 illustrates one embodiment of a screen shot of a user interface of a weld angle correction tool showing a travel angle help popup.
Figure 28:
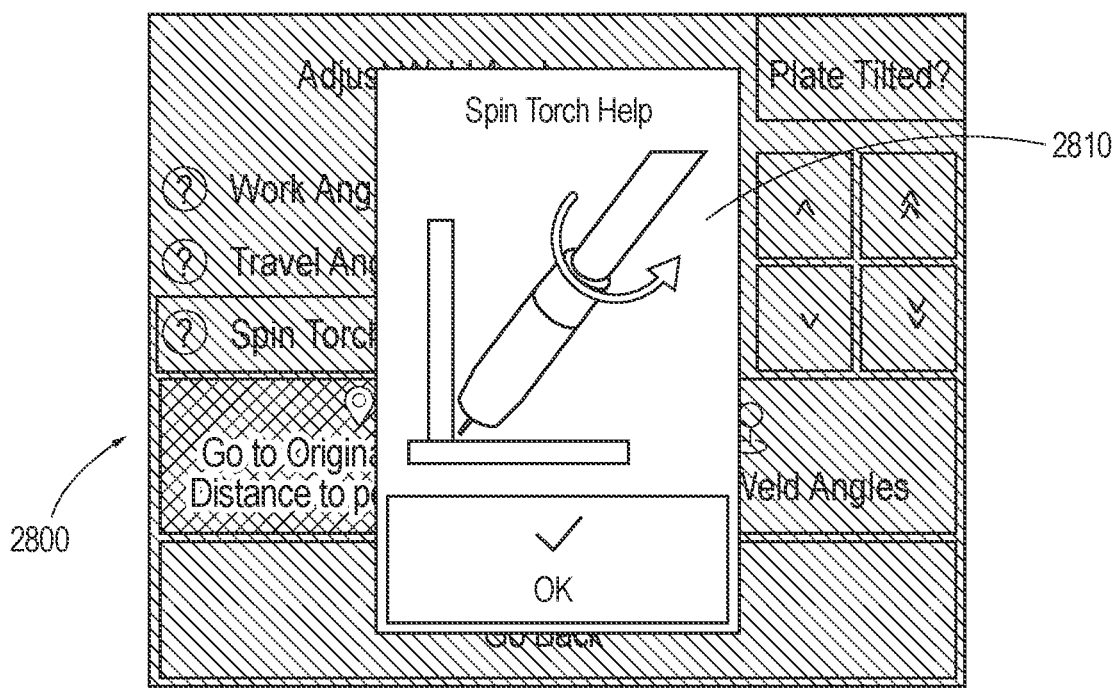
FIG. 28 illustrates one embodiment of a screen shot of a user interface of a weld angle correction tool showing a spin torch help popup.

FIG. 18 illustrates one embodiment of a screen shot 1800 of a user interface of a weld angle correction tool showing angle selection rows 1820. FIG. 18 shows three selectable rows in the Adjust Weld Angles window 1810, namely Work Angle, Travel Angle, and Spin Torch. Each of these is a defined angle in the weld coordinate frame. The user may also select the question mark icon to the left of each row, which will open a popup help window containing a figure that can demonstrate exactly what angle is measured or what motion is associated with the selected row. For example, FIG. 26 illustrates one embodiment of a screen shot 2600 of a user interface of a weld angle correction tool showing a work angle help popup window 2610. FIG. 27 illustrates one embodiment of a screen shot 2700 of a user interface of a weld angle correction tool showing a travel angle help popup window 2710. FIG. 28 illustrates one embodiment of a screen shot 2800 of a user interface of a weld angle correction tool showing a spin torch help popup window 2810.

Figure 19:
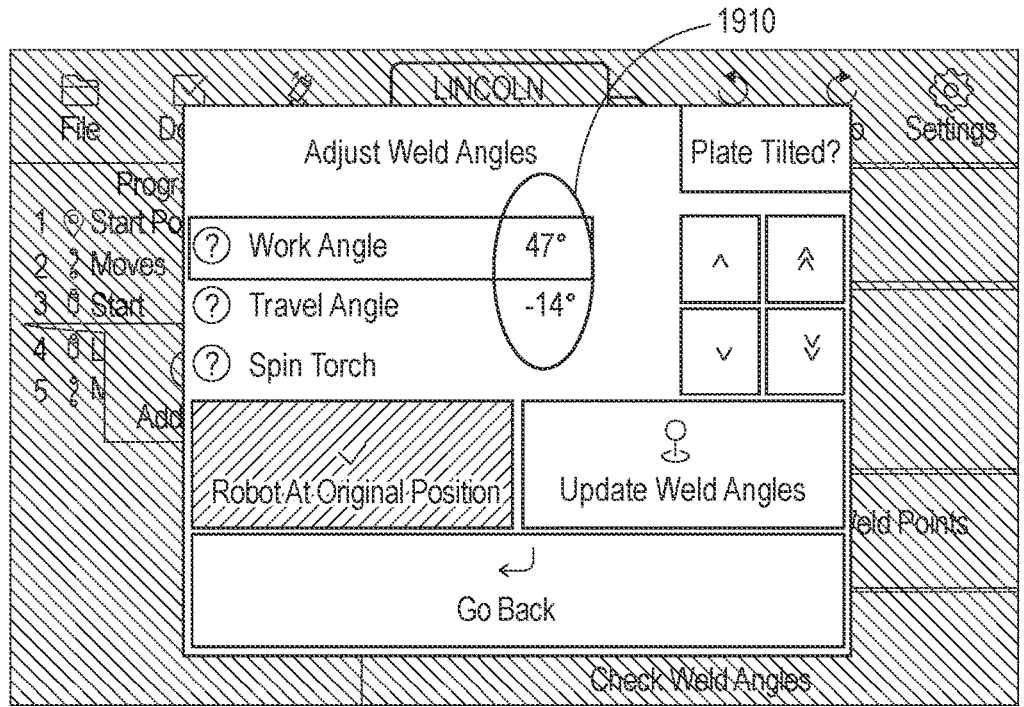
FIG. 19 illustrates one embodiment of a screen shot of a user interface of a weld angle correction tool showing numeric angles.

FIG. 19 illustrates one embodiment of a screen shot 1900 of a user interface of a weld angle correction tool showing numeric angles. FIG. 19 shows the numeric display 1910 of what the measured angles currently are (work angle and travel angle). The Spin Torch row does not have a numeric measure displayed because the information is deemed to be unimportant to the operator, in accordance with one embodiment. The ability to spin the torch is provided for avoiding collisions and achieving the needed reach, but the numeric angle measure does not affect the weld quality as the work angle and travel angle do.

Figure 20:
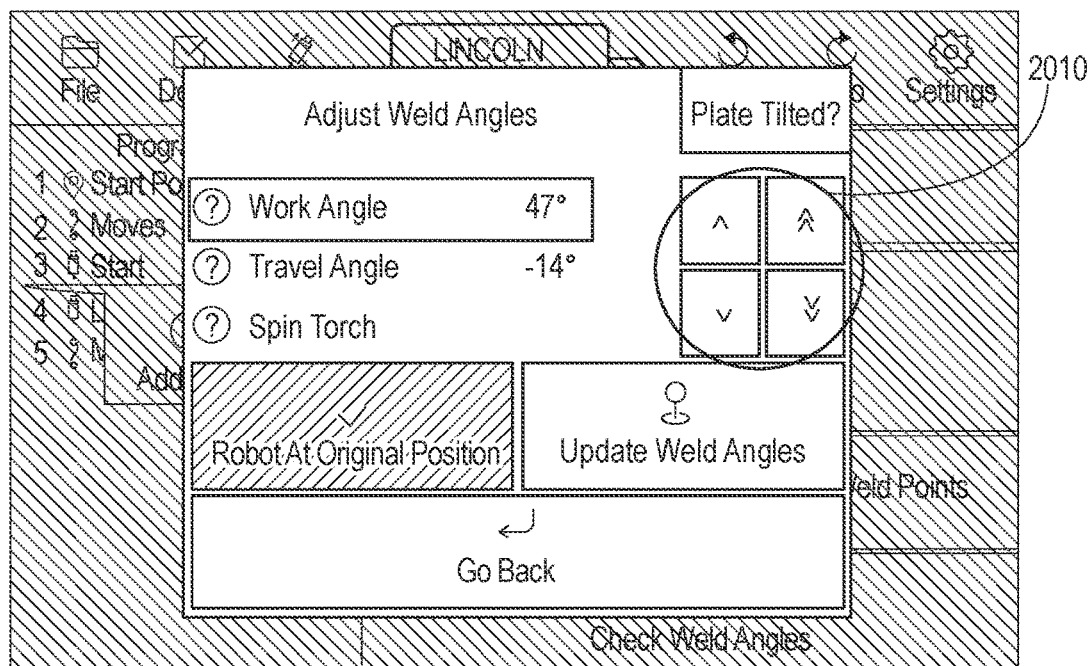
FIG. 20 illustrates one embodiment of a screen shot of a user interface of a weld angle correction tool showing fine adjustment buttons.

FIG. 20 illustrates one embodiment of a screen shot 2000 of a user interface of a weld angle correction tool showing fine adjustment buttons. FIG. 20 shows the "Bump Buttons" 2010, which when selected will adjust the robot's physical position to match a bump in angle in the selected row. This live updating of the robot position during angle adjustments allows the operator to verify that there are no collision or reach issues. If the robot does collide or is unable to reach the desired position, the operator is notified. Starting from the top left and going clockwise in FIG. 20, the bump angle amounts are +1 degree, +5 degrees, −1 degree, and −5 degrees. The single and double chevron icons are to indicate "small" or "large" fine adjustments, respectively.

Figure 21:
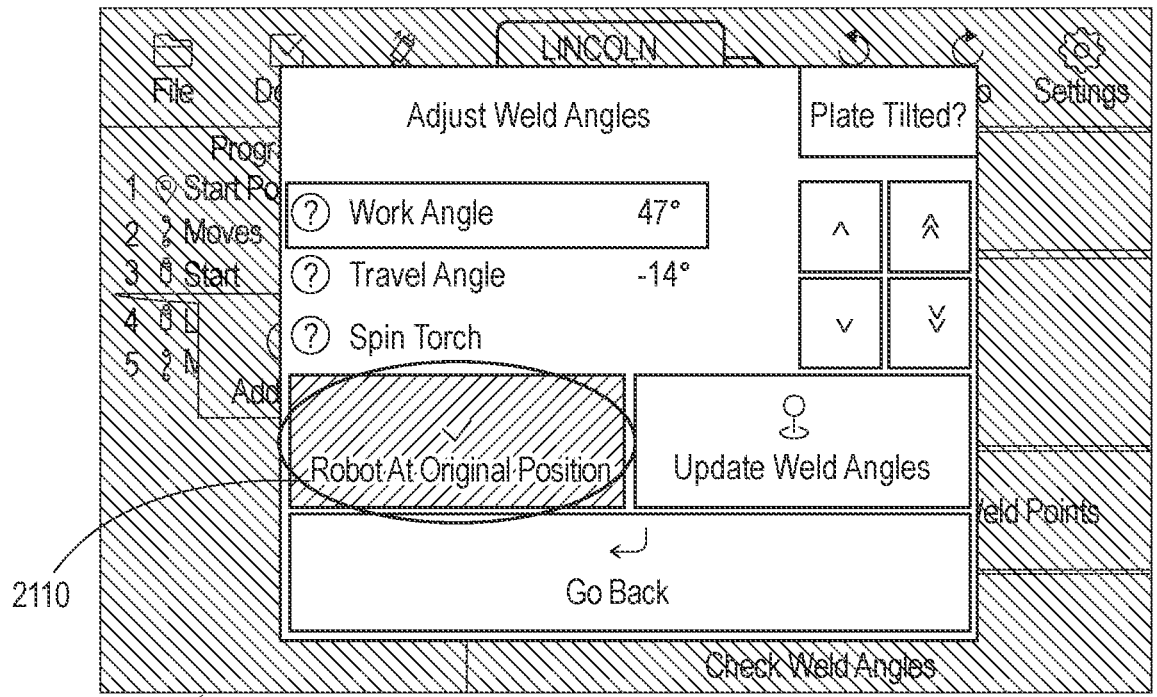
FIG. 21 illustrates one embodiment of a screen shot of a user interface of a weld angle correction tool showing an original position button.
Figure 22:
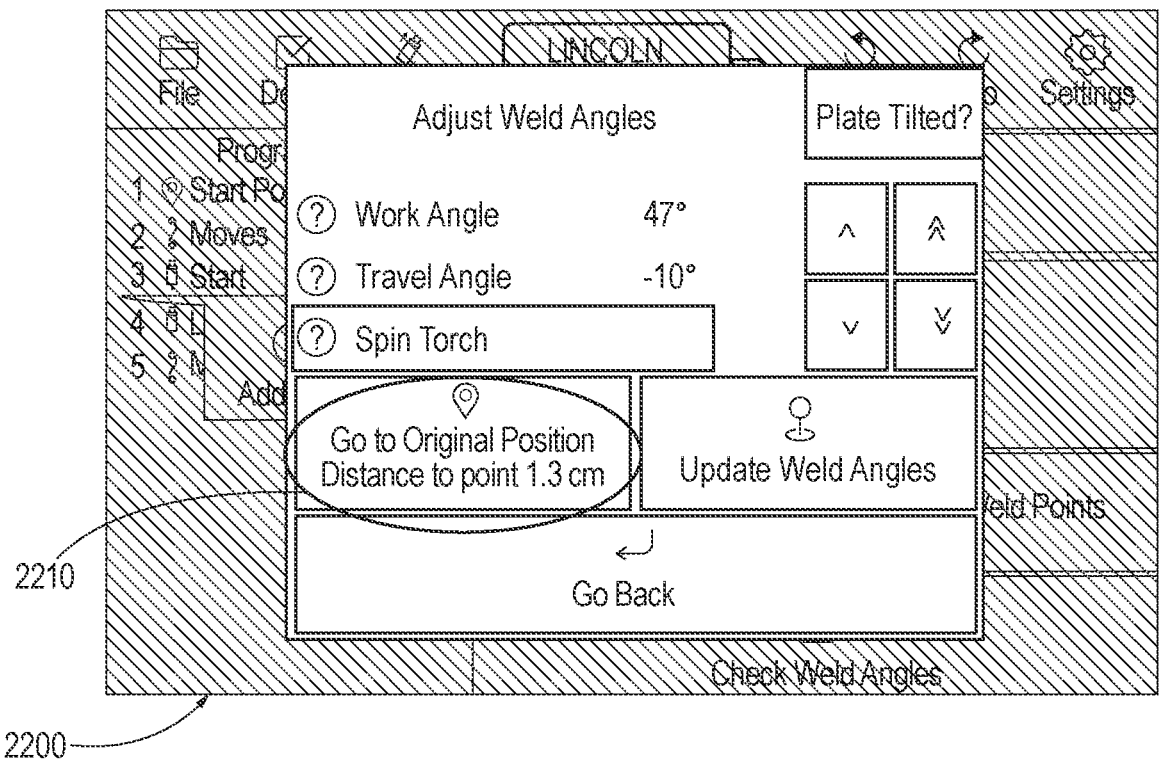
FIG. 22 illustrates one embodiment of a screen shot of a user interface of a weld angle correction tool showing a go to position button when not at position.

FIG. 21 illustrates one embodiment of a screen shot 2100 of a user interface of a weld angle correction tool showing an original position button 2110. That is, FIG. 21 shows a button 2110 that informs the user if the robot is at the taught weld point. Pressing the button will cause the robot to move to the taught weld point. FIG. 22 illustrates one embodiment of a screen shot 2200 of a user interface of a weld angle correction tool showing a go to position button 2210 when not at position. If the user physically moves the robot away, the button 2110 will change to the button 2210 of FIG. 22, showing the user that the robot is not at the taught weld point. The robot should first be at the taught weld point's cartesian location to use the weld torch angle tools.

Figures 23, 24:
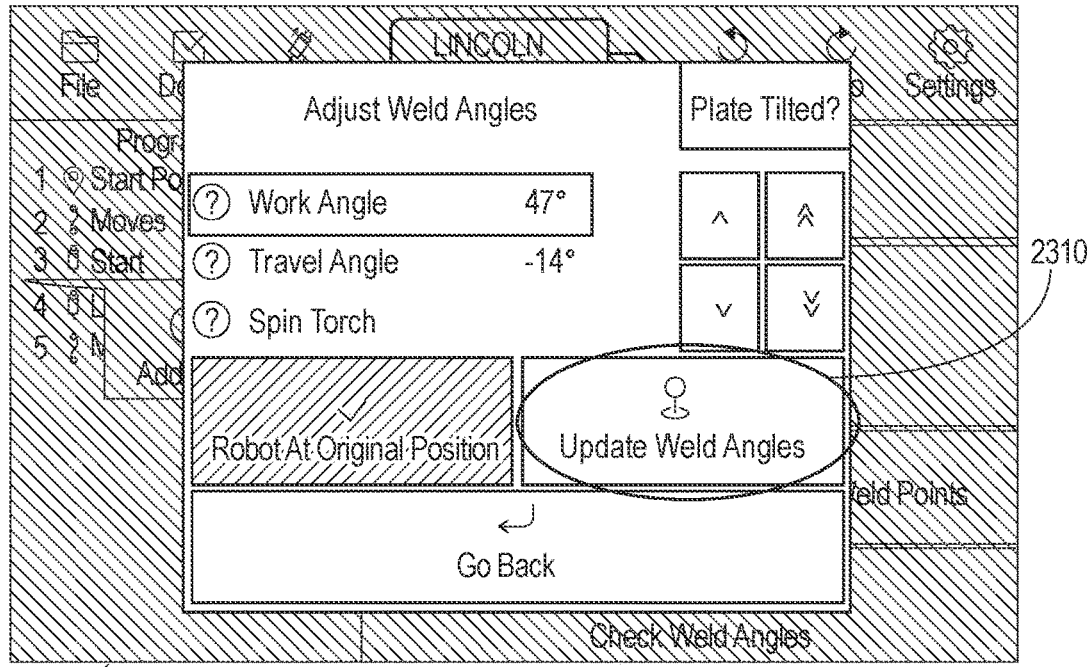
FIG. 23 illustrates one embodiment of a screen shot of a user interface of a weld angle correction tool showing and update button.
FIG. 24 illustrates one embodiment of a screen shot of a user interface of a weld angle correction tool showing a plate tilted button.

FIG. 23 illustrates one embodiment of a screen shot 2300 of a user interface of a weld angle correction tool showing an update button 2310. FIG. 23 shows the Update Button 2310 which will update the taught weld point in the program with the current robot position. This is for when the operator is finished with any adjustments and wishes to save the changes.

Figure 25:
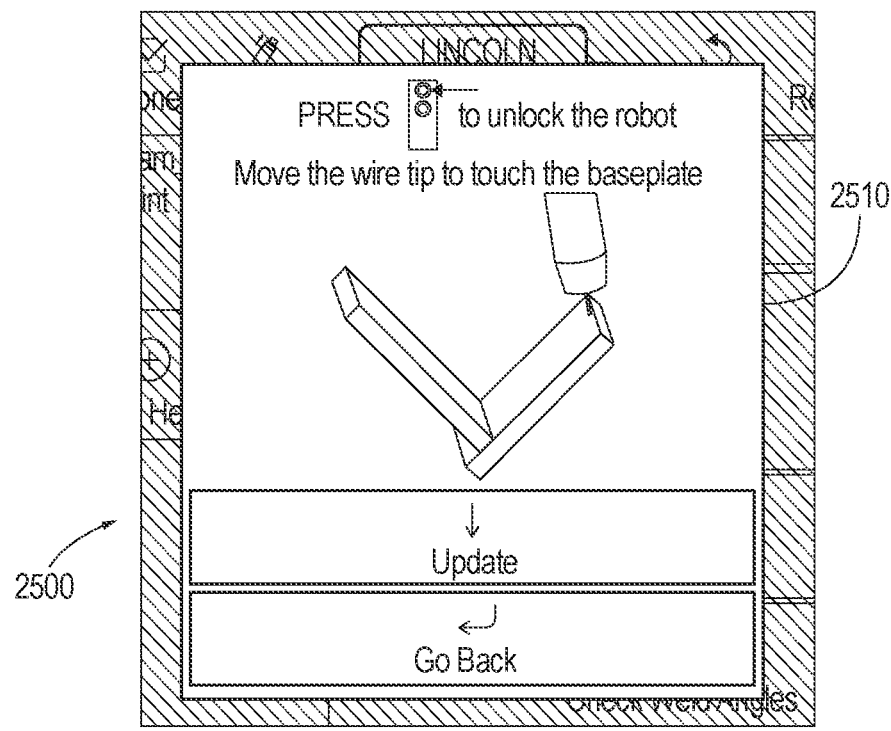
FIG. 25 illustrates one embodiment of a screen shot of a user interface of a weld angle correction tool facilitating adjustment of a weld baseplate.

FIG. 24 illustrates one embodiment of a screen shot 2400 of a user interface of a weld angle correction tool showing a plate tilted button 2410. When pressed, the "Plate Tilted" button 2410 opens up the "Plate Tilted" popup 2510 as shown in FIG. 25. FIG. 25 illustrates one embodiment of a screen shot 2500 of a user interface of a weld angle correction tool facilitating adjustment of a weld baseplate. If the plate is tilted, this means that the zero axis for the work angle is tilted. The popup 2510 walks the operator through using the robot to teach a new baseplate point. After the new baseplate point is taught, the work angle is adjusted to account for the tilt.

For example, in one embodiment, the user teaches the robot system where the plane of a base plate, as tilted, is located and which side of the weld seam the base plate is on. In this way, the weld angles for the weld seam can be accurately adjusted in the weld seam for the tilted base plate. If there are no additional sensors being used in the robot system to help identify plate positions and orientations of a weldment to be welded, then the minimum input that is needed is a $3^{rd}$ point somewhere on the baseplate (in addition to the start and stop points on the weld seam). The $3^{rd}$ point is not constrained to any particular location on the plate, but it is important which plate is being identified between the two plates being joined. This is enough to create a new weld reference frame to fully transfer the weld angles. The depth camera 410 could be used as an alternative input method for gaining the plane normal information, though there still may be user input required if the difference in the two plates being jointed cannot be automatically detected (i.e., which one is 'baseplate'?).

In addition to the fine-tuning being in the torch coordinate frame (i.e., rotational movement), translational tuning in the weld coordinate frame directions can also be accomplished, in accordance with one embodiment. For example, translational tuning may be accomplished by allowing the operator to make small changes in position along the weld path, into and out of the weld path, or normal to the plane along the weld path and into and out of it. Therefore, instead of having to grab the torch and move it manually, for example, the operator can use the weld tools to make fine-tuned adjustments in the weld coordinate frame (e.g., along the base plate), not just in the torch coordinate frame (e.g., work angle, travel angle). The translational origin of the weld frame is the taught TCP location of a weld point and orientation of the torch when the operator creates the weld program (having programmed motion trajectory). The orientation of the weld frame is based on the surrounding weld points with the taught weld point.

As an alternative, a lead-thru mode can be used. The lead-thru mode is where the operator pushes a button on the robot to unlock the arm of the robot so the arm can be moved by the operator. For example, in one embodiment, angle selection enables the lead-thru mode in one direction (as selected by the operator) and locks out other directions. This allows the operator to physically move the robot in only one axis or rotational direction. The user could then follow up, if desired, with further fine tuning using the bump buttons as discussed above herein.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A weld angle correction tool for adjusting angles of a welding torch positioned by a user while training a robot of a robotic welding system, the weld angle correction tool comprising:
    a computer device configured to operatively interface to the robotic welding system and having weld torch angle software application tools;
    a display operatively interfacing to the computer device; and
    at least one user interface operatively interfacing to the computer device, where the weld torch angle software application tools are programmed to:
    display user interface screens on the display,
    allow a user to interact with the user interface screens, via the at least one user interface, to make fine adjustments to at least one torch angle of a welding torch of the robotic welding system, where the at least one torch angle is associated with a taught weld point for a weldment,
    command the collaborative robot to move the welding torch based on the fine adjustments to the at least one torch angle in real time as the user makes the fine adjustments via the user interface screens, and
    allow the user to electronically save the weld point with the fine adjustments.

2. The weld angle correction tool of claim 1, wherein the weld torch angle software application tools are programmed to aid the user in confirming the fine adjustments, as commanded.

3. The weld angle correction tool of claim 1, wherein the weld torch angle software application tools are programmed to display a workflow to the user via the user interface screens to guide the user to teach the robotic welding system a tilt of a baseplate of the weldment and automatically adjust the at least one torch angle based on the tilt.

4. The weld angle correction tool of claim 1, wherein the weld torch angle software application tools are programmed to:
  calculate a weld frame and an orientation of the welding torch with respect to the weld frame;
  parse the orientation into a work angle measurement and a travel angle measurement; and
  present the work angle measurement and the travel angle measurement to the user via the user interface screens.

5. The weld angle correction tool of claim 1, wherein the at least one torch angle includes a torch work angle or a torch travel angle.

6. The weld angle correction tool of claim 1, wherein the weld torch angle software application tools are programmed to allow a user to edit a weld point via the user interface screens and the at least one user interface.

7. The weld angle correction tool of claim 1, wherein the weld torch angle software application tools are programmed to display an adjust weld angles window as one of the user interface screens, allowing the user to adjust a torch work angle, a torch travel angle, and a torch spin via the at least one user interface.

8. The weld angle correction tool of claim 1, wherein the weld torch angle software application tools are programmed to allow the user to adjust the at least one torch angle by increments of +1 degree, +5 degrees, −1 degree, and −5 degrees via the user interface screens and the at least one user interface.

9. The weld angle correction tool of claim 1, wherein the weld torch angle software application tools are programmed to allow the user to command the robotic welding system, via the user interface screens and the at least one user interface, to move the welding torch to the taught weld point.

10. The weld angle correction tool of claim 1, wherein the weld torch angle software application tools are programmed to allow the user to make fine adjustments in a weld coordinate frame at least along a base plate of the weldment.

11. A robotic welding system for adjusting angles of a welding torch positioned by a user while training the robotic welding system, the robotic welding system comprising:
  a robot having an arm;
  a welding torch operatively connected to the arm of the robot;
  a robot controller operatively connected to the robot; and
  a weld angle correction tool including:
    a computer device configured to operatively interface to the robot controller and having weld torch angle software application tools,
    a display operatively interfacing to the computer device, and
    at least one user interface operatively interfacing to the computer device, where the weld angle correction tool is configured to:
    display user interface screens on the display,
    allow a user to interact with the user interface screens, via the at least one user interface, to make fine adjustments to at least one torch angle of the welding torch of the robotic welding system, where the at least one torch angle is associated with a taught weld point for a weldment,
    command the collaborative robot to move the welding torch based on the fine adjustments to the at least one torch angle in real time as the user makes the fine adjustments via the user interface screens, and
    allow the user to electronically save the weld point in the robot controller with the fine adjustments.

12. The robotic welding system of claim 11, wherein the weld angle correction tool is configured to aid the user in confirming the fine adjustments, as commanded.

13. The robotic welding system of claim 11, wherein the weld angle correction tool is configured to display a workflow to the user via the user interface screens to guide the user to teach the robotic welding system a tilt of a baseplate of the weldment and automatically adjust the at least one torch angle based on the tilt.

14. The robotic welding system of claim 11, wherein the weld angle correction tool is configured to:
  calculate a weld frame and an orientation of the welding torch with respect to the weld frame;
  parse the orientation into a work angle measurement and a travel angle measurement; and
  present the work angle measurement and the travel angle measurement to the user via the user interface screens.

15. The robotic welding system of claim 11, wherein the at least one torch angle includes a torch work angle or a torch travel angle.

16. The robotic welding system of claim 11, wherein the weld angle correction tool is configured to allow a user to edit a weld point via the user interface screens and the at least one user interface.

17. The robotic welding system of claim 11, wherein the weld angle correction tool is configured to display an adjust weld angles window as one of the user interface screens, allowing the user to adjust a torch work angle, a torch travel angle, and a torch spin via the at least one user interface.

18. The robotic welding system of claim 11, wherein the weld angle correction tool is configured to allow the user to adjust the at least one torch angle by increments of +1 degree, +5 degrees, −1 degree, and −5 degrees via the user interface screens and the at least one user interface.

19. The robotic welding system of claim 11, wherein the weld angle correction tool is configured to allow the user to command the robotic welding system, via the user interface screens and the at least one user interface, to move the welding torch to the taught weld point.

20. The robotic welding system of claim 11, wherein the weld angle correction tool is configured to allow the user to make fine adjustments in a weld coordinate frame at least along a base plate of the weldment.

* * * * *